(12) United States Patent
Crowther et al.

(10) Patent No.: US 7,982,441 B2
(45) Date of Patent: Jul. 19, 2011

(54) CONVERTER CIRCUIT

(75) Inventors: Mark Crowther, Saunderstown, RI (US); Wenkai Wu, East Greenwich, RI (US); George Schuellein, Narragansett, RI (US)

(73) Assignee: International Rectifier Corporation, El Segundo, CA (US)

( * ) Notice: Subject to any disclaimer, the term of this patent is extended or adjusted under 35 U.S.C. 154(b) by 746 days.

(21) Appl. No.: 12/030,269

(22) Filed: Feb. 13, 2008

(65) Prior Publication Data
US 2008/0197823 A1 Aug. 21, 2008

Related U.S. Application Data

(60) Provisional application No. 60/890,061, filed on Feb. 15, 2007.

(51) Int. Cl.
*G05F 1/40* (2006.01)
(52) U.S. Cl. .......... 323/237; 323/225; 323/272
(58) Field of Classification Search .......... 323/222, 323/225, 237, 240, 271, 272, 284
See application file for complete search history.

(56) References Cited

U.S. PATENT DOCUMENTS

| | | | | |
|---|---|---|---|---|
| 6,628,106 | B1 * | 9/2003 | Batarseh et al. | 323/222 |
| 7,026,798 | B2 * | 4/2006 | Cheung et al. | 323/225 |
| 7,071,660 | B2 * | 7/2006 | Xu et al. | 323/266 |
| 7,859,238 | B1 * | 12/2010 | Stratakos et al. | 323/282 |
| 7,888,918 | B2 * | 2/2011 | Wu et al. | 323/224 |
| 2007/0188219 | A1 | 8/2007 | Segarra | |
| 2008/0157742 | A1 * | 7/2008 | Martin et al. | 323/284 |

* cited by examiner

*Primary Examiner* — Jessica Han
(74) *Attorney, Agent, or Firm* — Farjami & Farjami LLP

(57) ABSTRACT

A multiphase converter comprising a plurality of converter circuits, each converter circuit having series connected high and low side switches connected across a voltage bus with a common node provided therebetween, each of the common nodes connected through a respective inductor to an output node of the converter coupled to a load, the high and low side switches each being controlled by a control circuit to provide a desired output voltage at the output node, the control circuit including a first circuit for disabling and enabling at least one phase in response to a condition of the load, the circuit causing the high side switch to be turned on prior to the lower side switch when a disabled phase is enabled.

22 Claims, 18 Drawing Sheets

PSI IMPLEMENTATION

PSI IMPLEMENTATION

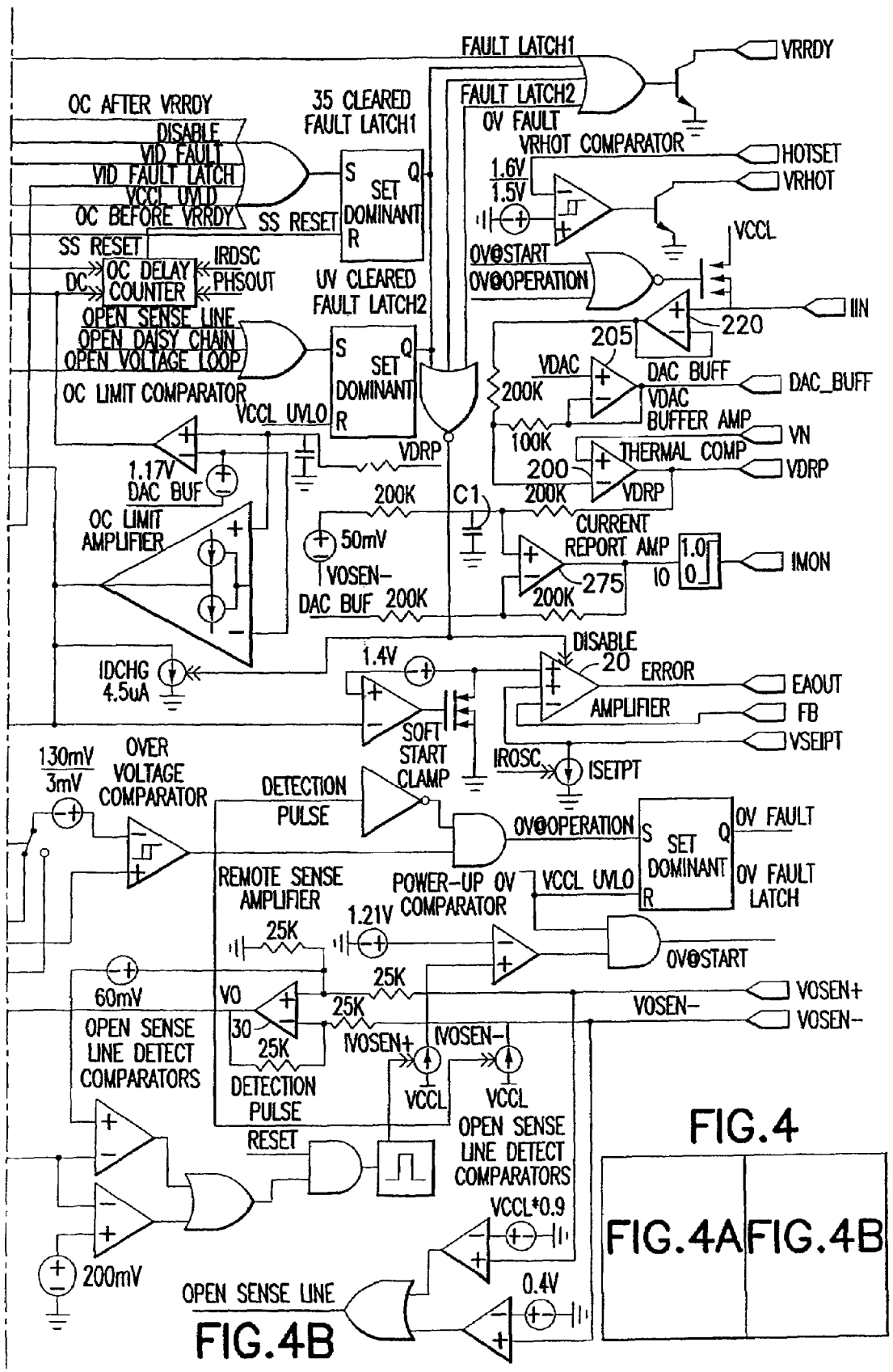

CONVERTER CIRCUIT

CROSS-REFERENCE TO RELATED APPLICATIONS

The present application claims the benefit and priority of U.S. Provisional Application Ser. No. 60/890,061 filed Feb. 15, 2007 entitled ONE NTC THERMAL COMPENSATION AND POWER STATE INDICATOR IMPLEMENTATION FOR DC-DC CONVERTER, the entire disclosure of which is hereby incorporated by reference.

BACKGROUND OF THE INVENTION

The present invention relates to DC-DC converters and in particular, to a DC-DC converter having improved features including improved transient response in a multiphase converter application, improved response to a power state indication signal indicating the load condition, thermal compensation for the inherent DC resistance of the phase output inductors and providing improved converter output current information.

In a running multiphase buck converter, when a phase that was previously shut down is turned on, if the low side switch is turned on before the high side switch, this can result in a perturbation in the current sharing loop resulting in poor transient response and might also saturate the inductors in already operating phases. It is an object of the invention to reduce this perturbation and improve the transient response of a multiphase converter when a phase is turned on.

A further object of the present invention is to utilize the PSI (power state indicator) signal that is provided from the CPU being powered by the converter. Typically, multiphase converters are used to power microprocessor CPU chips. The CPU maker provides a PSI indication signal to indicate the load requirements. During light load condition, PSI can be used to shut down phases to reduce related switching losses. During heavy load, the signal can be used to add phases. Adding or removing phases leads to a loop bandwidth change and a poor transient response. It is an object of the present invention to utilize the PSI signal to overcome the interaction between load change and converter loop bandwidth change and to improve the converter transient response to the PSI signal.

Electricity usage has seen a tremendous growth, particularly in datacenters in recent years. Server farms and data centers are demanding higher efficiency for servers. Green power requirements are also pushing the industry to pursue more efficient power conversion.

In reality, server processors function in either idle state, approximately 20% of full load, or running state. Shedding phases can substantially reduce the switching losses and improve idle state efficiency, as shown in FIGS. 1A and 1B. Phase shedding operation improves the efficiency by dropping certain phases in a multiphase regulator when not needed. This is determined by instruction from the processor and other devices in a system. The actual algorithm is generated by either the microprocessor CPU or the voltage regulator itself to operate the regulator at the most efficient point. This could be called "power on demand" operation. A new generation of microprocessors provides Power State Indicator (PSI) signal to enable the voltage regulator to maximize its conversion efficiency. When PSI is asserted, the CPU will enter into a low or idle power operation state.

Phase shedding can reduce power conversion losses, but the voltage loop dynamically changes as well. The LC double pole of the converter transfer function moves in accordance with the number of phases present in the loop. Average current sharing is widely used to balance the current per phase in voltage mode regulators. Current loop perturbations occur once the number of phases present in the loop change, even with no change in load, since the rest of the phases need to source the current previously carried by the shedding phases.

In addition, the PSI signal normally accompanies a load change. It is important to control the dynamic changing in the number of phases around these transient events. When the load increases, more phases are needed and the corresponding lower output impedance and higher loop bandwidth are preferred. However, it is important to control inductor current of each phase being added to the regulator. The inductor current of each disabled phase is zero during the PSI assertion period. When a disabled phase is added back with no inductor current, the modulator may respond by enabling the synchronous MOSFET. This causes the added phase to sink current, which imposes an extra load to the rest of the phases, and it is even possible to have the inductors saturate. Such a scenario also brings larger current differences between the existing phases and newly added phases, and it takes a longer time to reach the balance point.

In addition, modern microprocessors can rapidly shift between a sleep state and full load operation, placing a heavy requirement on the voltage regulator (VR) to stabilize its output voltage. Further, such a load transient can occur with a high repetition rate. As aforementioned, if synchronous FETs are turned on ahead of control FETs when PSI de-asserts, a current perturbation occurs and if high repetitive transients occur and the repetition frequency is higher than the current sharing loop bandwidth, the converter might see a larger than normal current excursion range for each phase. Excessive output voltage ripple or inductor saturation might occur. An excessive voltage variation could cause the microprocessor to malfunction, reset, latch up or fail. Therefore, it is important that the phase shedding implementation does not sacrifice the low output impedance needed for transient performance.

Another object of the invention is to improve the widely used phase output inductor direct current resistance (DCR) sensing technique. The DCR sensing technique relies on the inherent inductor direct current resistance to provide lossless current sensing. With this method, it is not necessary to place a resistor in series with the output inductor, thereby preventing the losses incurred by having a series output resistance. A drawback of the lossless DCR current sensing technique is that there is a temperature dependency of the measured current information since the DCR changes with temperature. In the past, in power converters, several components with negative temperature coefficient (NTC) and even combined with other components with positive temperature coefficient (PTC), are introduced in the converter circuit to obtain correct current information, and also to provide overcurrent protection. It is an object of the present invention to provide a technique which utilizes only a signal NTC component to provide correct current information.

A further object of the present invention is to provide a current monitor output (IMON) with programmable slope to provide accurate converter current information referenced to a remote Kelvin ground.

SUMMARY OF THE INVENTION

A first aspect of the invention addresses the phase turn on perturbation that can occur if the low side switch is turned on first, which means that the phase being turned on will sink current and put more load on the already running phases. This results in a large perturbation in the current sharing loop and can also lead to saturation of the inductor for the already running phases. To solve this problem, the invention assures that the high side switch is always turned on ahead of the low side switch, thereby minimizing the impact on dynamic current sharing among the phases and improving the transient response of the converter.

According to yet a further aspect, the invention utilizes the power state indication (PSI) output from the CPU such that phases are shed with a preset delay after the PSI signal requiring phase(s) to be shed is received. Such an arrangement allows higher bandwidth to respond to load change and less output voltage variation.

According to a further aspect of the invention, in order to compensate for the indicator DCR change due to temperature, uncompensated current information referenced to the converter voltage reference is presented to a correction circuit and corrected for inductor DCR temperature change by a difference amplifier with a programmable resistor network containing an NTC thermistor. The resulting output is corrected for temperature changes in the inductor DCR and referenced to the converter reference voltage that sets the converter output voltage.

Furthermore, the invention also comprises, according to another aspect, providing an output that is a voltage representation of the converter current information. The current information contained in the compensated current information is subtracted from the converter reference, summed with an offset voltage and the resulting output is referenced to a remote sense (Kelvin) ground. The output is a voltage representation of the converter current information, the slope of which can be programmed with a resistor network connected to the above-described difference amplifier.

Other features and advantages of the present invention will become apparent from the detailed description which follows.

BRIEF DESCRIPTION OF THE DRAWING(S)

The invention will now be described in greater detail in the following detailed description with reference to the drawings in which:

FIG. 1 shows the controller of the multiphase converter and FIG. 2 shows a two-phase converter which is controlled by the control circuit of FIG. 1;

Figure 7:
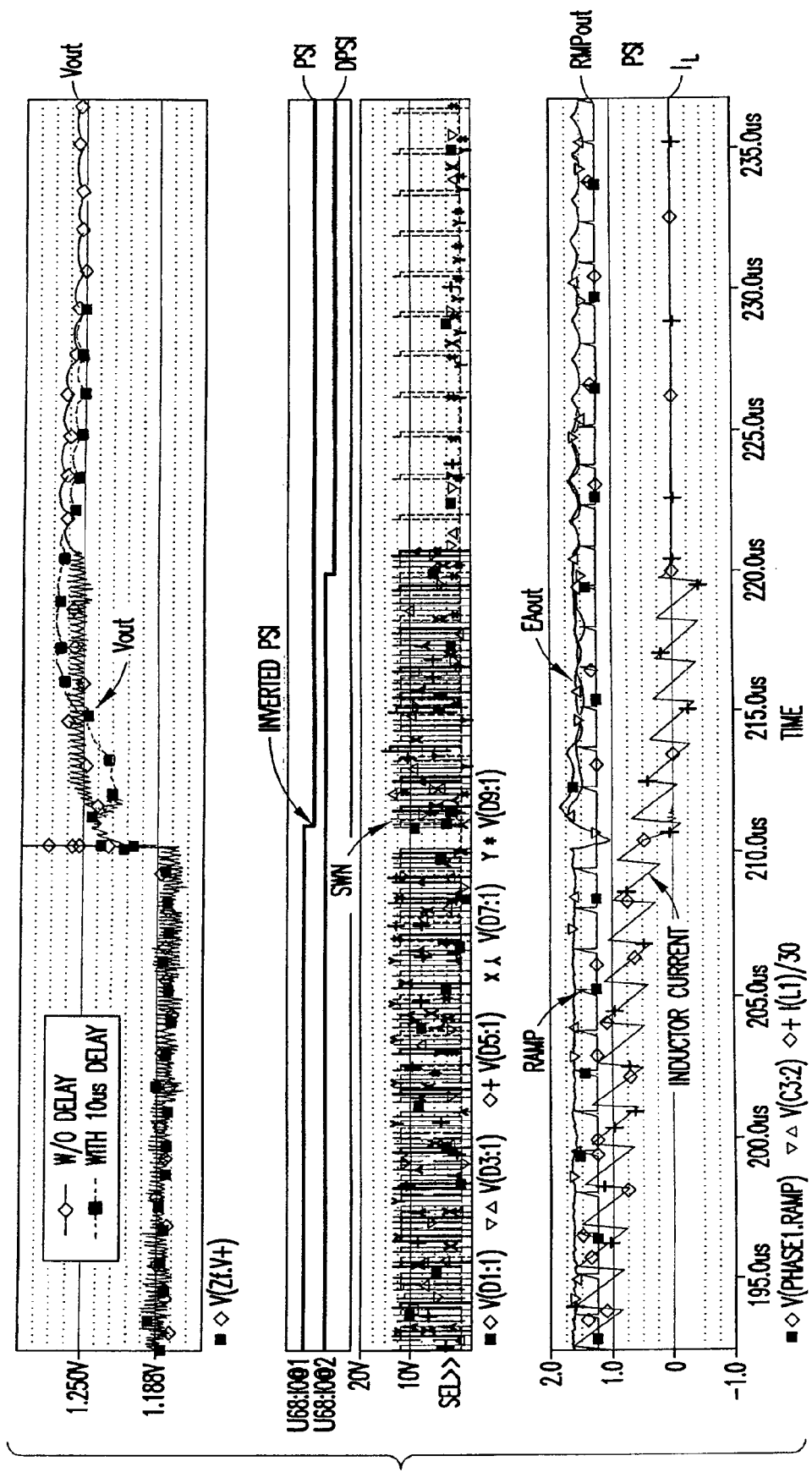
Figure 8:
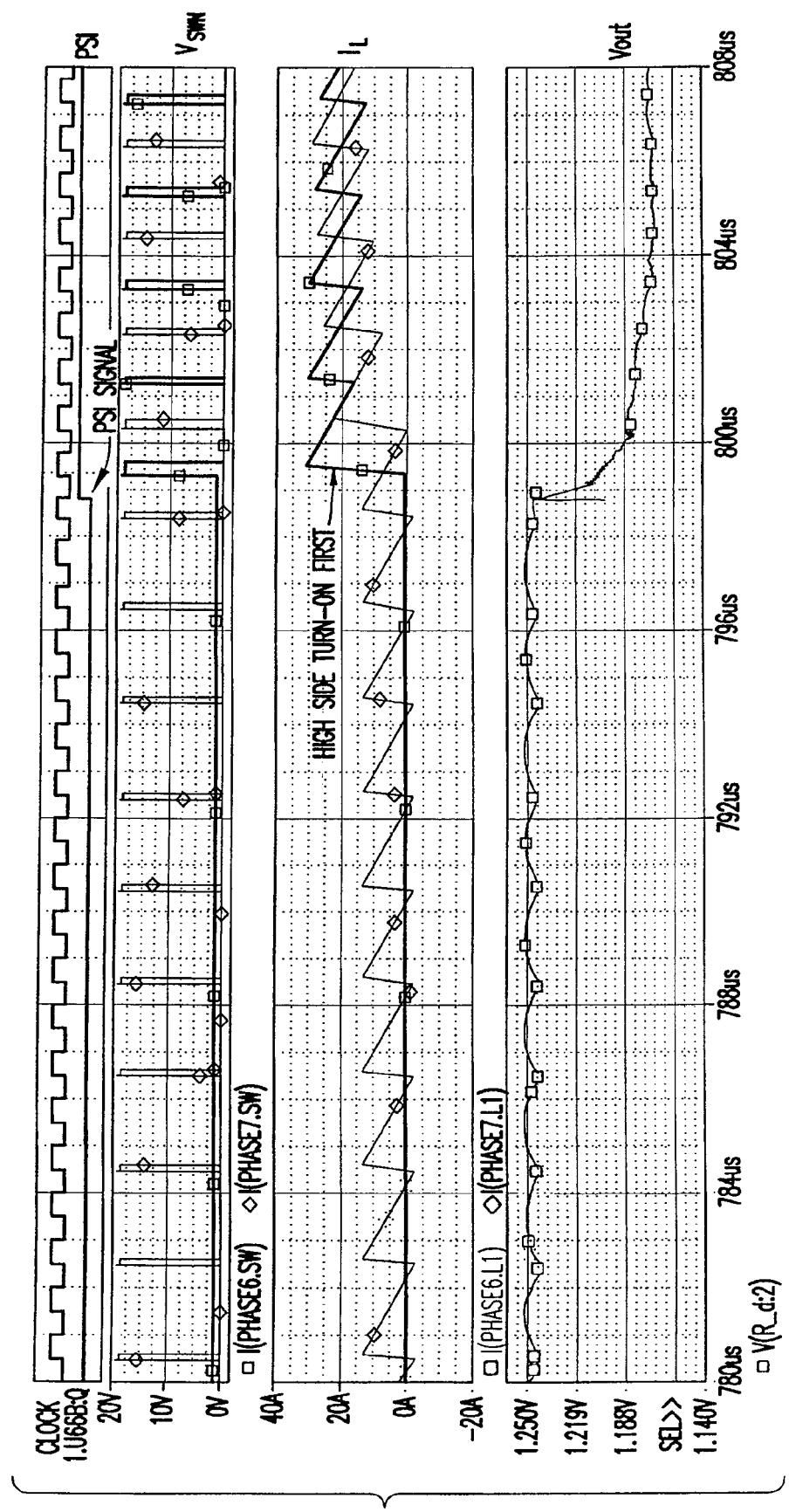
Figure 9:
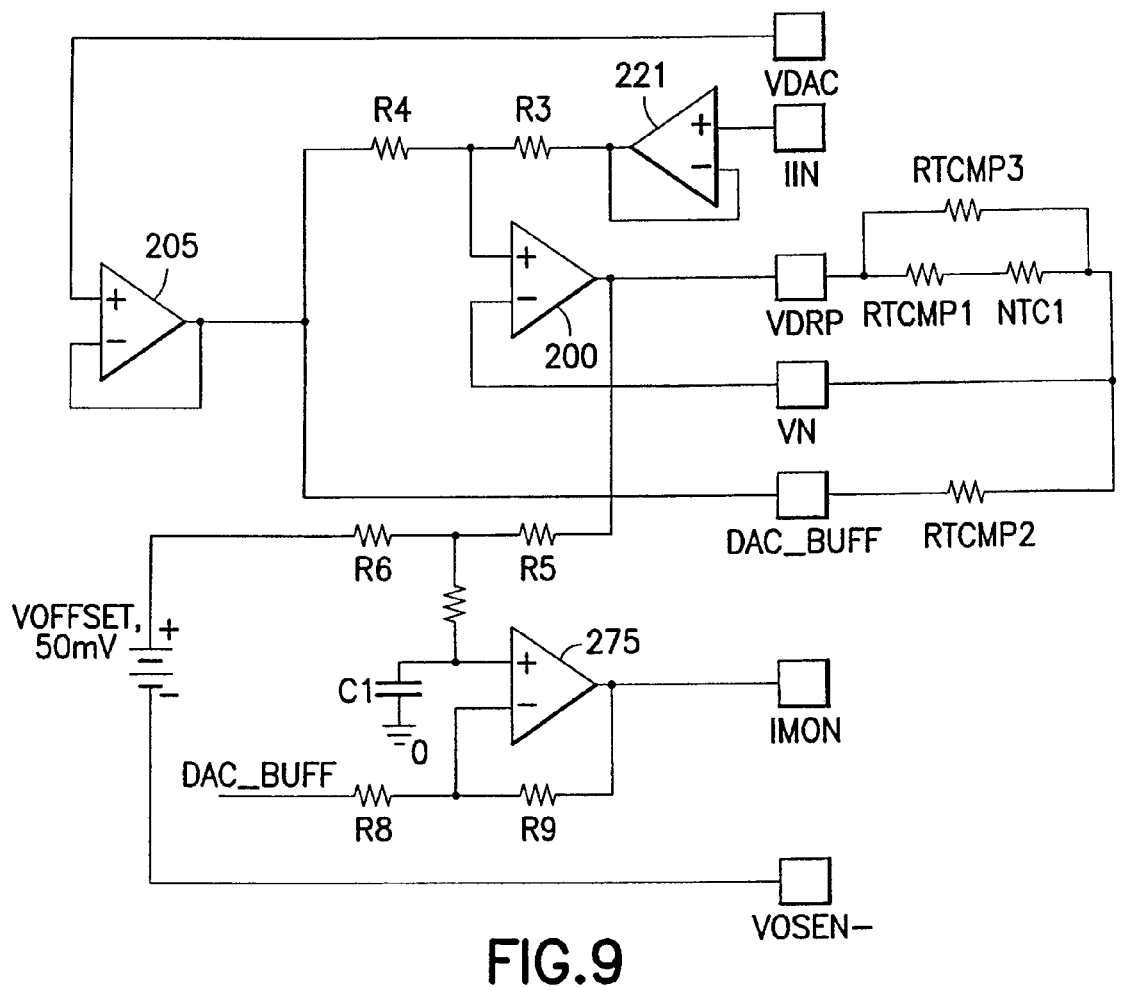
Figure 10:
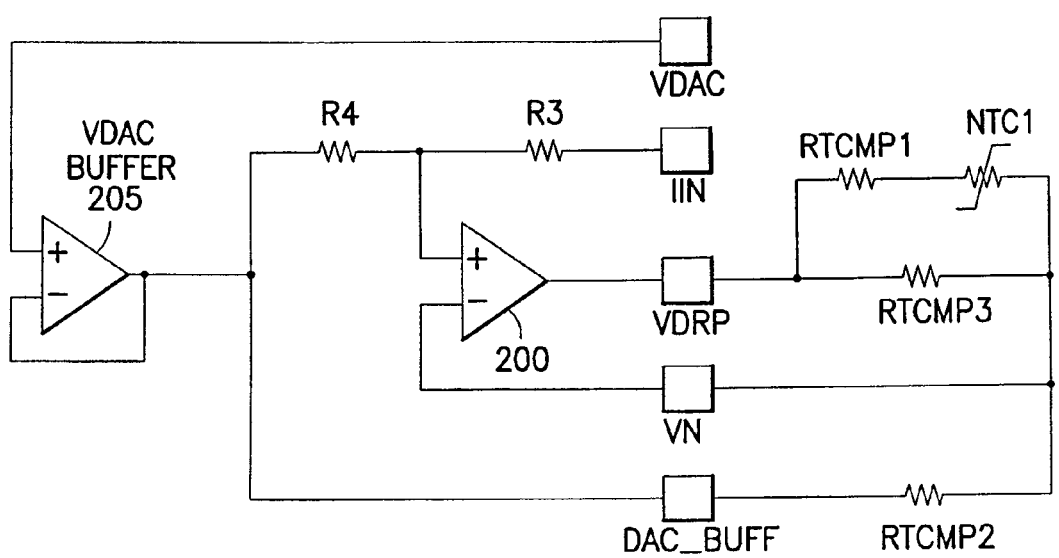

FIG. 7 presents waveforms showing the improved response of the converter when a turn-off delay in response the PSI signal is implemented;

FIG. 8 shows waveforms showing the high side switch turning on first and improving the response of the converter;

FIG. 8A-8G shows various waveforms of the converter;

FIG. 9 shows the current monitor circuit for providing the current monitor signal; and FIG. 10 shows the thermal compensation circuit for compensating for inductor DCR.

DETAILED DESCRIPTION OF PREFERRED EMBODIMENTS OF THE INVENTION

Figure 1:
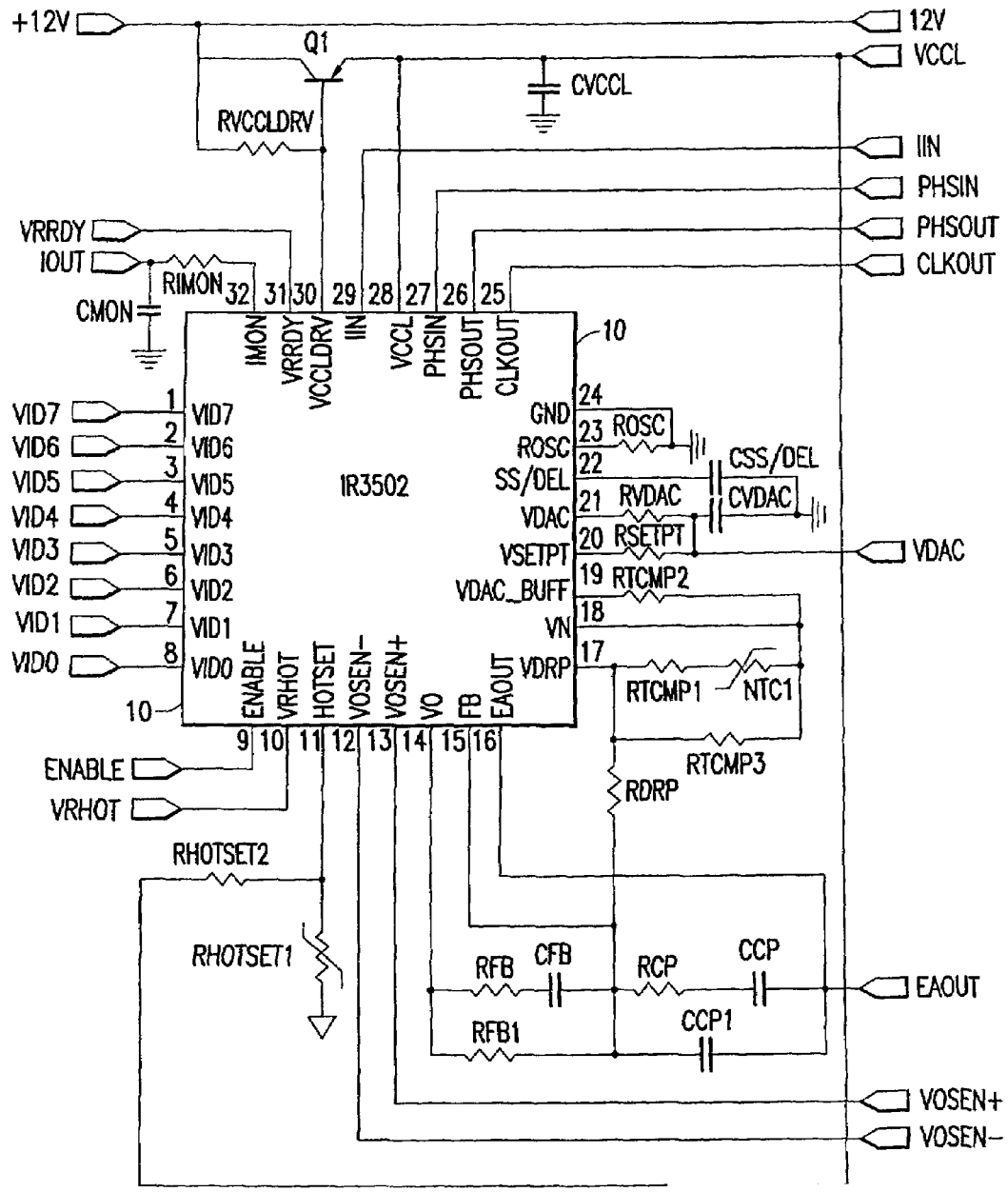
FIGS. 1 and 2 show a multiphase converter, in particular.
Figure 1A:
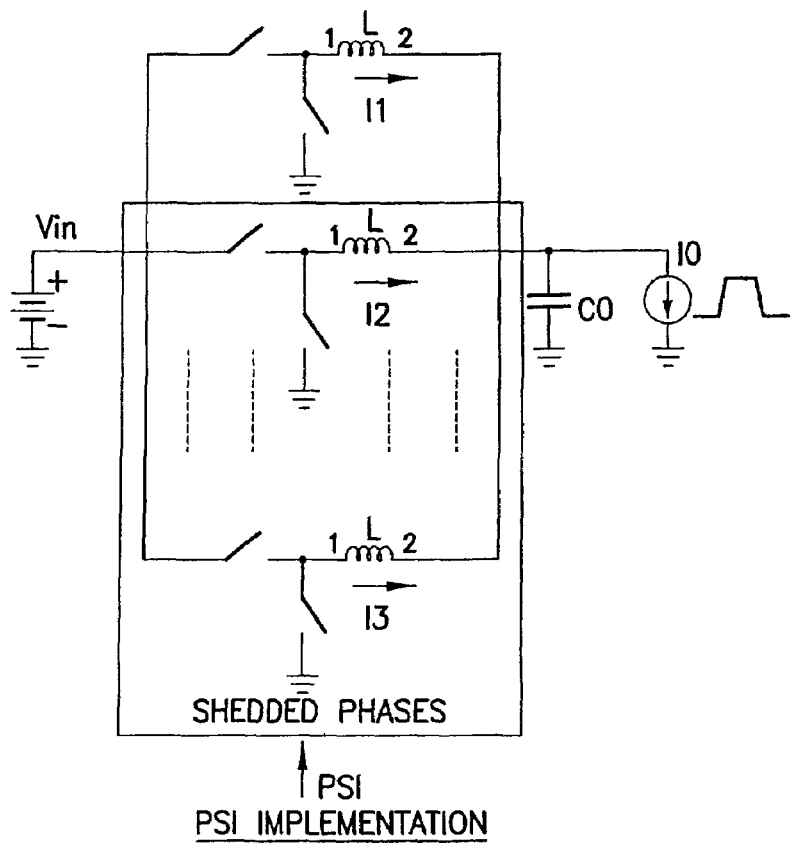
FIG. 1A shows a block diagram of a multiphase converter having a PSI input for instructing the converter to perform phase shedding or phase adding.
Figure 1B:
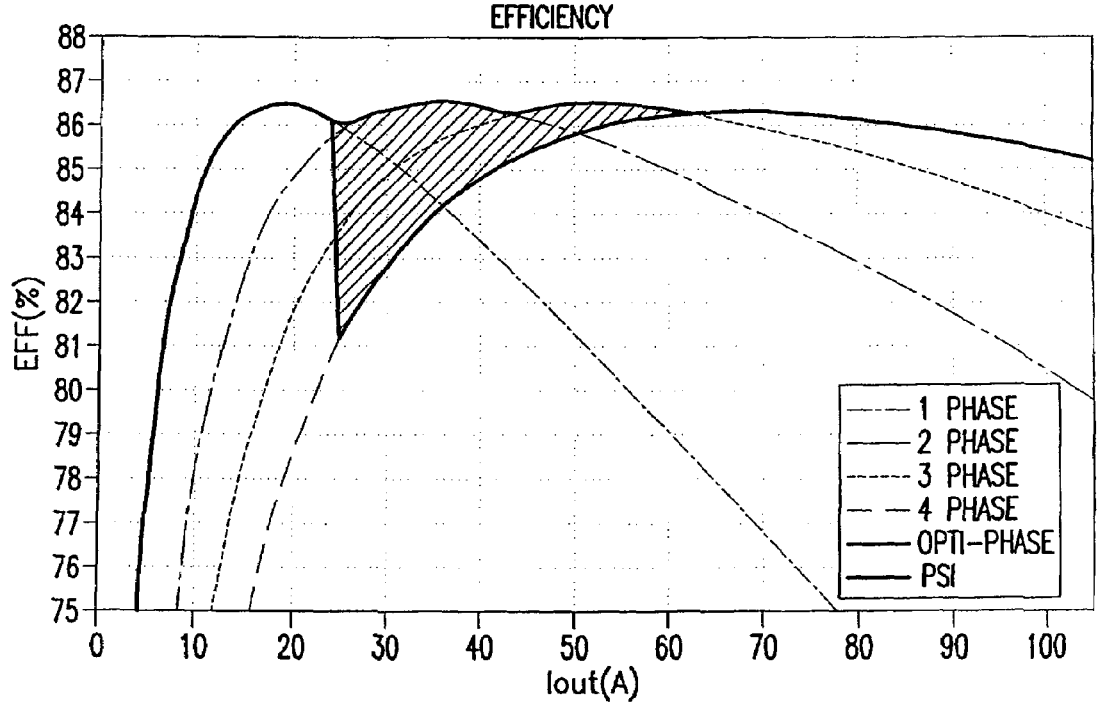
FIG. 1B is a graph of converter efficiency for different number of phases versus current.
Figure 2A:
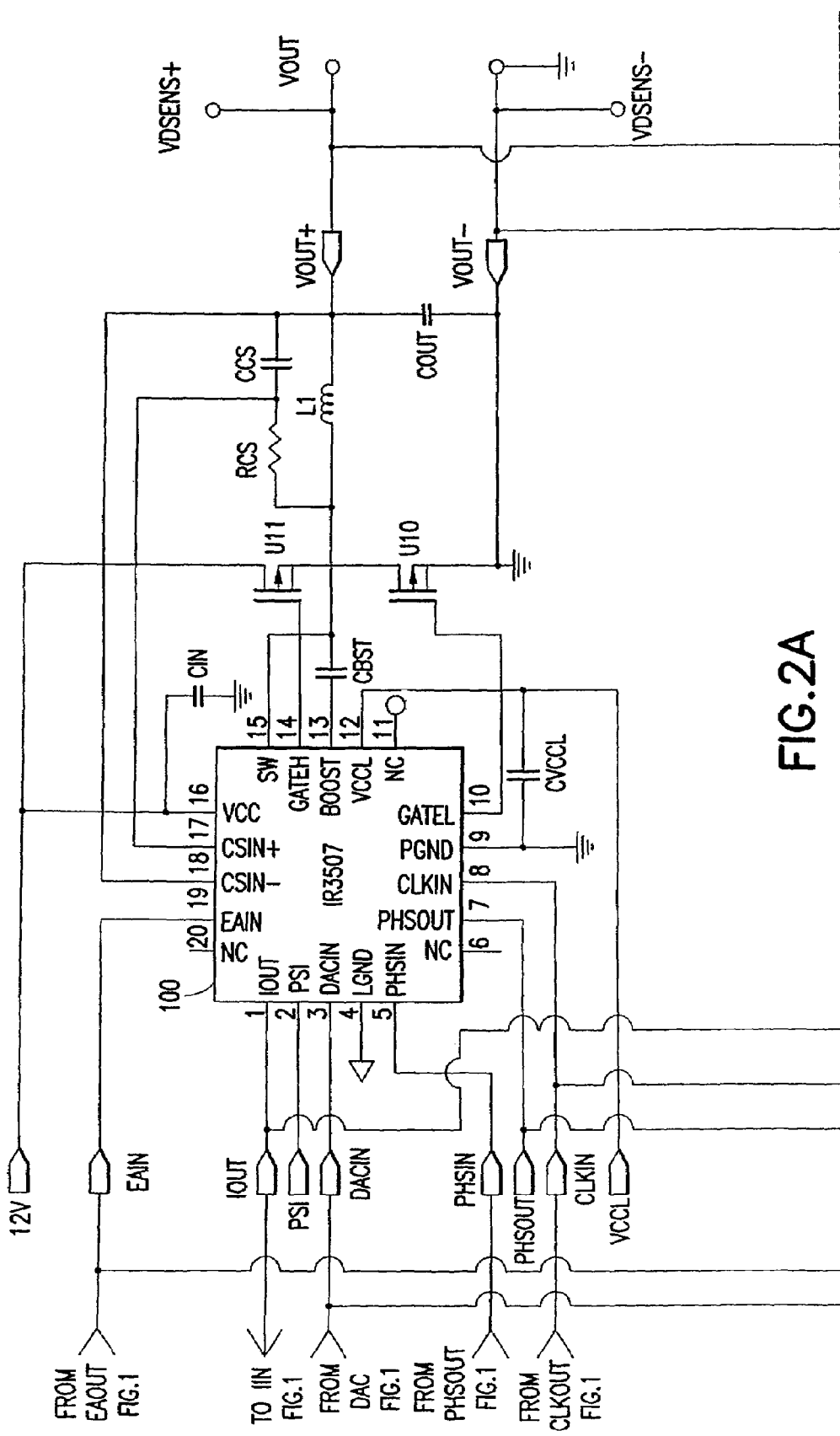
Figure 2:
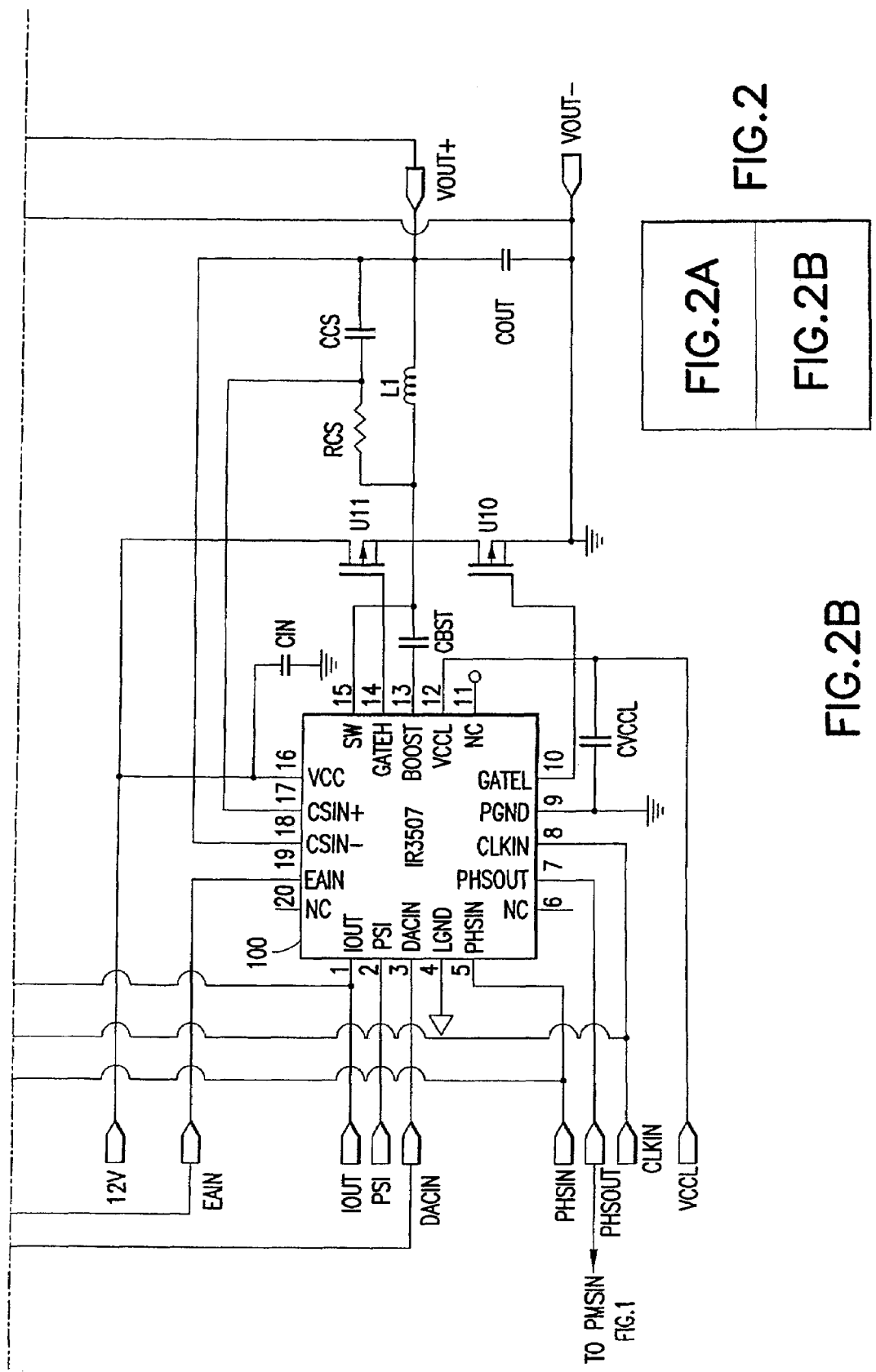

With reference to FIGS. 1 and 2, these figures show a two-phase multiphase converter. FIG. 1 shows the control circuit including a control IC 10 and FIG. 2 shows the output converter circuits including phase ICs 100. Since there are two phase ICs 100, a two-phase multiphase converter is shown. Additional phases can be provided by implementing additional phase ICs 100 and connecting the outputs together and the various inputs together either in parallel as shown for certain connections, or in daisy chain arrangement for the phasing signals from the control IC as well known to those of skill in the art, and particularly as known in connection with the International Rectifier X-Phase line of multiphase converter integrated circuits.

Turning to FIG. 1, this shows the control integrated circuit 100. The control integrated circuit illustratively receives a 12 volt supply and produces a low side driver supply VCCL and ground GND. In addition, the control IC receives VID inputs, VID0 through VID7 which are received from the CPU and which are digital signals that determine the converter output voltage. These digital signals are converted by a digital to analog converter, as will be described in more detail with respect to FIG. 4, into an analog signal called VDAC which represents the desired converter output voltage. This reference VDAC is provided as an output to the phase ICs shown in FIG. 2 (called DAC IN at the phase IC).

In addition, the control IC 10 provides an output PHSOUT which provides a timing signal for controlling the phase ICs of FIG. 2. The signal PHSOUT is fed into line PHSIN of FIG. 2. An output PHSOUT of the first phase IC 100 is then provided to the input PHSIN of the second phase IC 100 in daisy chain fashion. If more phase ICs are provided, the PHSOUT of the second phase IC 100 would be provided into the PHSIN terminal of the succeeding phase integrated circuit, etc. The last phase IC 100, shown in FIG. 2, output PHSOUT is fed to the PHSIN input of the control IC 10 of FIG. 1.

In addition, there is a clock output CLKOUT in FIG. 1 which provides a clock signal to all of the phase integrated circuits 100. The clock output is at a frequency equal to the individual converter phase switching frequency multiplied by the number of phases. Accordingly, in the illustrated two phase converter, CLKOUT=2XPHSOUT.

An error amplifier output EAOUT which drives the phase integrated circuits 100 of FIG. 2, and in particular, provides information to the pulse width modulators of the phase ICs to control the output switch pulse width modulation, is provided to the EAIN inputs of the phase integrated circuits 100 of FIG. 2.

VOUTSEN+ and VOUTSEN− are provided to sense the remote output voltage at the load after parasitic and distributed impedances.

In addition, an enable terminal is provided. When this input is high, the control integrated circuit is enabled. When it is low, it is in fault mode. Input VRHOT is provided for temperature monitoring. A resistor divider, including a thermistor, as shown in FIG. 1, VRHOTSET1, senses the voltage regulator temperature which is used by the VRHOT comparator (FIG. 4) connected to the VRHOT pin to shut off the regulator if the temperature exceeds the threshold.

VO is the remote sense amplifier output, and, after passing through an RC network represents the error amplifier output EAOUT.

Pin VDRP is the buffered, scaled and thermally compensated current signal. Terminal VN represents a node for the DCR thermal compensation network. VDAC_BUFF is the buffered VDAC voltage or the reference voltage for the converter.

VSETPT represents the error amplifier non-inverting input. The converter output voltage can be decreased from the VDAC voltage with an external resistor connection between the VDAC pin and this pin. VDAC is the regulator voltage reference programmed by the VID inputs, described above. An external RC network is connected to logic ground to program the dynamic VID slew rate and provide compensation for an internal buffer amplifier. PinSS/DEL provides converter start-up and overcurrent protection delay timing. It is also used to compensate the constant output current loop during soft start.

ROSC/OVP programs the oscillator frequency. The oscillator frequency equals the switching frequency per phase. It is also used for overvoltage protection.

Terminal IIN is the average current input from the phase integrated circuits. This pin is also used to communicate overvoltage condition to the phase integrated circuits. Pin VCCLDRV is the output of the VCCL regulator error amplifier to control the external regulator transistor Q1. This pin senses total power supply through resistor RVCCLDRV.

Pin VRRDY is an open collector output that drives low during start-up and under any external fault condition. Pin IMON is the voltage at IOUT which is proportional to the load current.

FIG. 2 shows the multiphase converter output circuit. As shown, this circuit comprises a two-phase buck converter. Each phase comprises low side or synchronous transistor switch U10 and high side or control transistor switch U11, the output inductor L1 and the output capacitor COUT. A single output capacitor COUT can be used. An inductor current sensing RC network comprising resistor RCS and capacitor CCS is provided across the inductor in each case. As well known, the voltage across the capacitor CCS is proportional to the inductor current. This voltage is provided to the current sense amplifier CSIN+ and CSIN− input terminals.

Each phase IC includes terminals IOUT which are connected together and when connected together represents the output of the current sensing amplifier of the phase IC. When connected together, the IOUT pins create a share bus which provides an indication of the average current being supplied by all the phases. This signal is used by the control IC of FIG. 1 for voltage positioning and overcurrent protection. Overvoltage protection OVP mode is initiated when the voltage on this pin rises above a threshold.

PSI is provided from the CPU that is being powered by the converter. When low, it is in a low power state which indicates that phases are to be shed.

DACIN represents the reference voltage from VDAC of the control IC. The current sense signal and PWM ramp are referenced to the voltage on this pin.

LGND represents the logic ground. PHSIN is the phase clock input as described above. PHSOUT is the phase clock output to the next phase IC (or for the last phase IC, the output to PHSIN of the control IC 10) as also described above. CLKIN is the clock input. PGND is the return for the low side driver and reference for the high side gate non-overlap comparator. GATE L is the low side driver output and input to the GATE H non-overlap comparator. VCCL, as described above, is the supply for the low side driver. Internal bootstrap synchronous PFET is connected from this pin to the BOOST pin. The BOOST pin is the supply for the high side driver provided by the internal bootstrap supply. The internal bootstrap synchronous PFET 315 is connected between this pin and the VCCL pin (see FIG. 5).

GATE H is the high side driver output and input to the GATE L non-overlap comparator. Terminal SW is the return for the high side driver, i.e., the switched node and the reference for the GATE L non-overlap comparator. The GATE L and GATE H non-overlap circuits ensure dead time between the switches U10 and U11.

Figure 5:
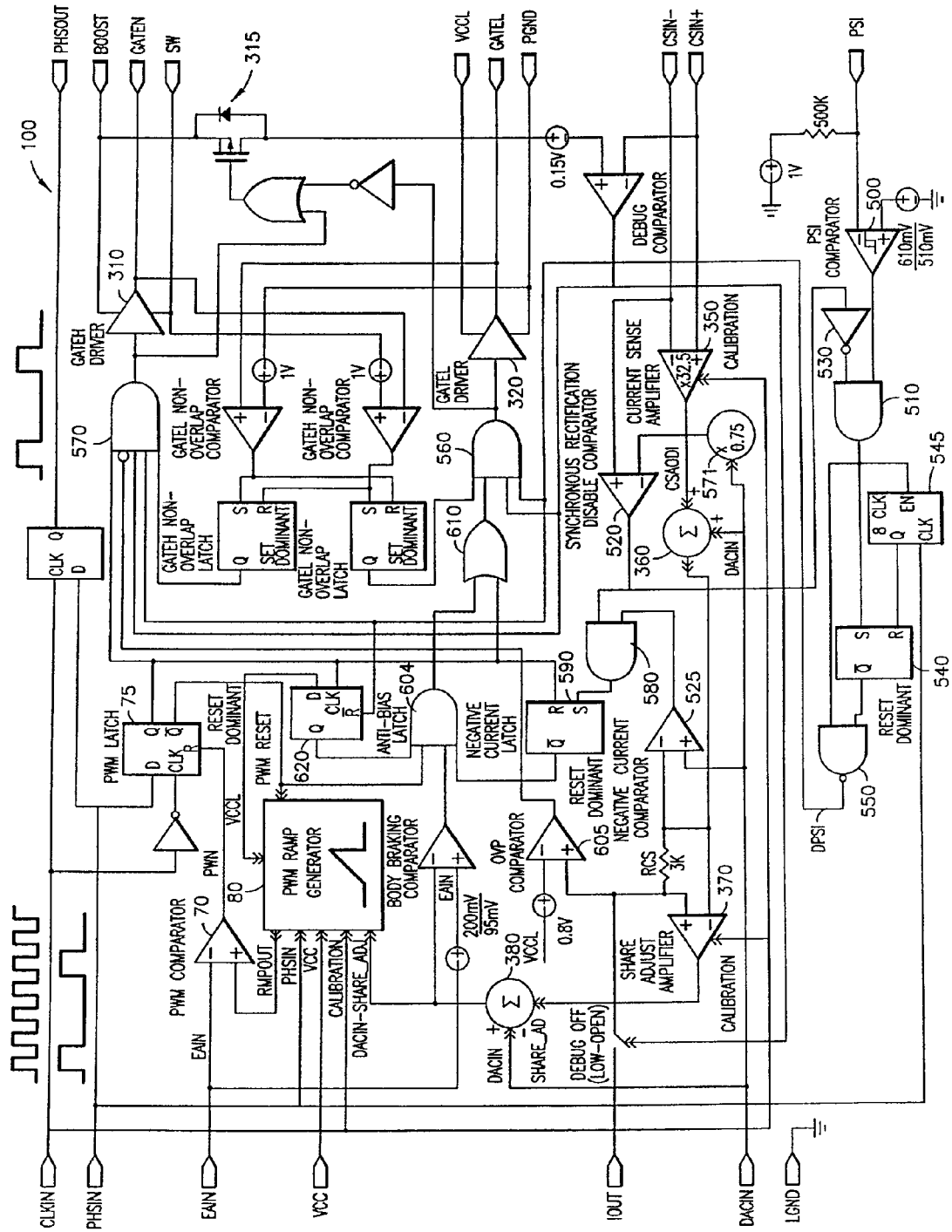
FIG. 5 shows a detailed block diagram of one of the phase ICs of FIG. 2.

VCC is the supply for internal circuits. CSIN+ and CSIN− are the inputs to the current sense amplifier, CSIN+ being the non-inverting input and CSIN− being the inverting input. CSIN+ input is also an input to a debug comparator and the CSIN− input is an input to the synchronous rectification disable comparator (FIG. 5).

EAIN is the PWM comparator (FIG. 5) input from the error amplifier of the control integrated circuit of FIG. 1. Body breaking mode is initiated if the voltage on this pin is less than DACIN.

As well known, in a multiphase converter, each phase provides output current to the load at a time determined by the control integrated circuit 10. Typically, the phases are sequenced such that when one phase goes off, the next phase comes on. In the multiphase converter of FIG. 2, which is a two-phase converter, the two phases are 180° out of phase. They are each operated as a buck converter so that when U11 is turned on, the inductor L1 is charged from the supply voltage and provides power to the load and charges the output capacitor. When U11 turns off, U10 is turned on with a dead time so that there is no overlap between the on times, thereby allowing the inductor current to continue to be sourced from ground and allowing the inductor to supply energy to the load. When U10 is turned off, U11 is turned back on, providing charging current for the inductor and the process continues, as well known to those of skill in the art.

Figure 3:
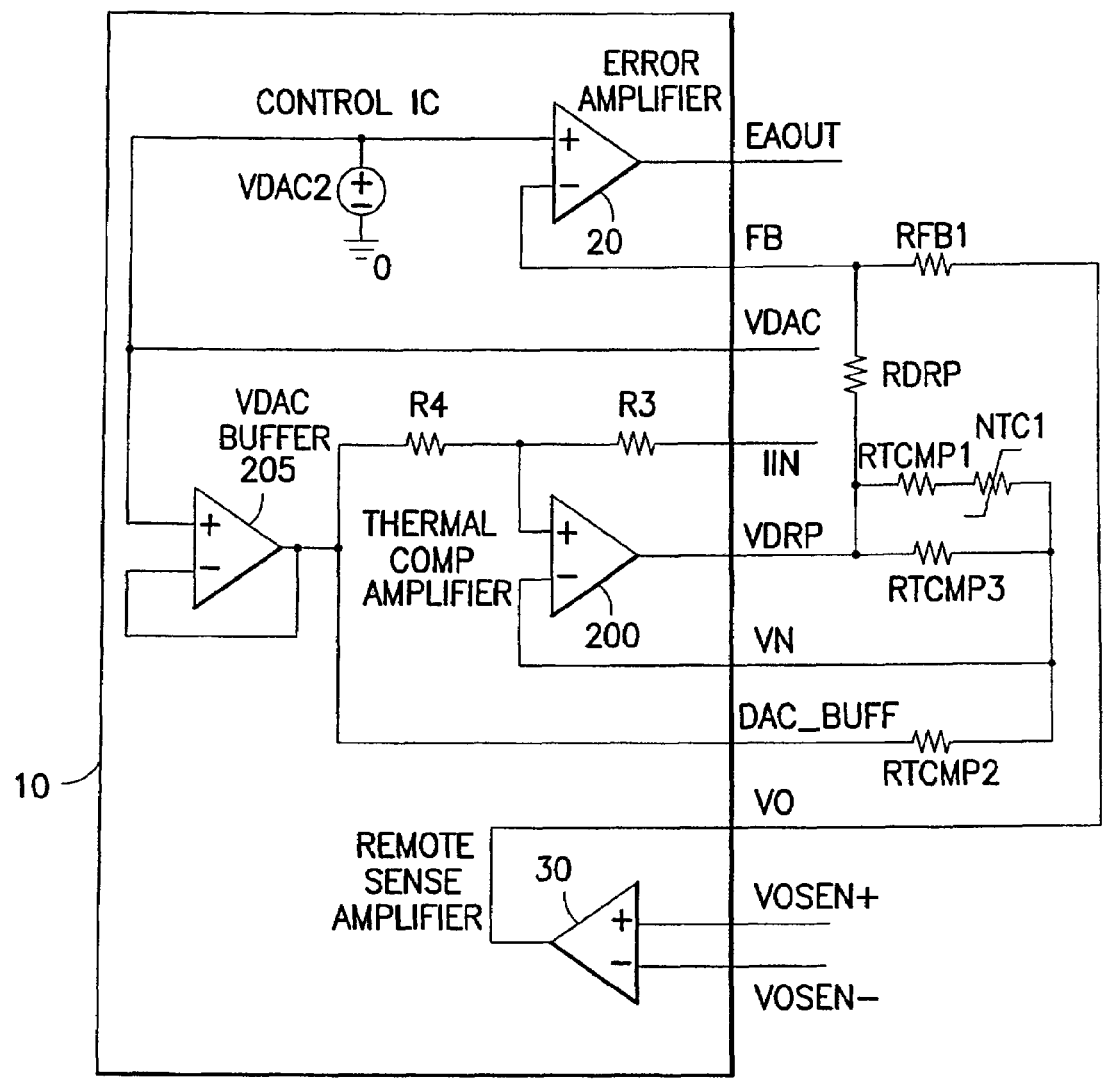
FIG. 3 shows a simplified block diagram of the control circuit of FIG. 1.

FIG. 3 represents a simplified block diagram of the control integrated circuit 10 of FIG. 1. In particular, FIG. 3 shows that the control integrated circuit 10 includes an error amplifier 20. The error amplifier receives a feedback signal FB which is obtained from the output voltage VO which is provided by the output of a remote sense amplifier 30. Remote sense amplifier 30 receives input VOSEN+ and VOSEN− from the load. See FIG. 2. The signal FB represents the feedback signal FB after passing through a resistor RFB1. This represents the output voltage of the converter. In the error amplifier 20, the output voltage at FB is compared to the voltage VDAC. VDAC is the analog value corresponding to the desired converter output voltage which is set by the VID terminals. See FIG. 1. The VID terminal signals are converted to a voltage VDAC by a digital to analog converter 50 shown in FIG. 4 and after passing through a buffer amplifier 60, the VDAC signal is generated.

In the error amplifier 20, the VDAC signal, that is, the desired converter output voltage after adjustment by a reference VDAC2, is compared to the feedback signal FB and an error signal is generated. The error signal is EAOUT. This signal is passed to each of the phase ICs 100 at the terminal EAIN and is compared in a PWM comparator 70 (see FIG. 5) to a ramp signal RMPOUT generated by a PWM ramp generator 80. In this way, the PWM signal is generated for driving the output switches U10 and U11 to achieve the desired output voltage. When the ramp signal RMPOUT exceeds the error amplifier signal EAIN, the PWM comparator issues a pulse. When EAIN exceeds RMPOUT, the pulse terminates, thereby setting the pulse width or duty cycle.

The control integrated circuit also includes a thermal compensation amplifier 200 (FIG. 3). Thermal compensation amplifier 200 receives an output from a VDAC buffer 205 representing the voltage VDAC through resistor R4. This is connected to the non-inverting input of the amplifier 200. Also provided to the non-inverting input by resistor R3 is the current IIN representing the average current input from the phase ICs. A thermal compensation network comprising resistors RTCMP1, RTCMP3 and a negative temperature coefficient thermistor NTC1 is coupled at the output of the amplifier 200. This results in a voltage VDRP. Accordingly, the uncompensated current information IIN, is referenced to VDAC by the resistors R3 and R4 and corrected for inductor DCR temperature change by the difference amplifier 200. The external resistor network comprising RTCMP1, RTCMP3 and the thermistor NTC1 provide a programmable network. The resulting output VDRP is current information which is corrected for temperature changes in the inductor DCR and is referenced to the voltage VDAC. Resistor RTCMP2 serves to reference the voltage VDRP to the voltage VDAC.

Figure 4A:
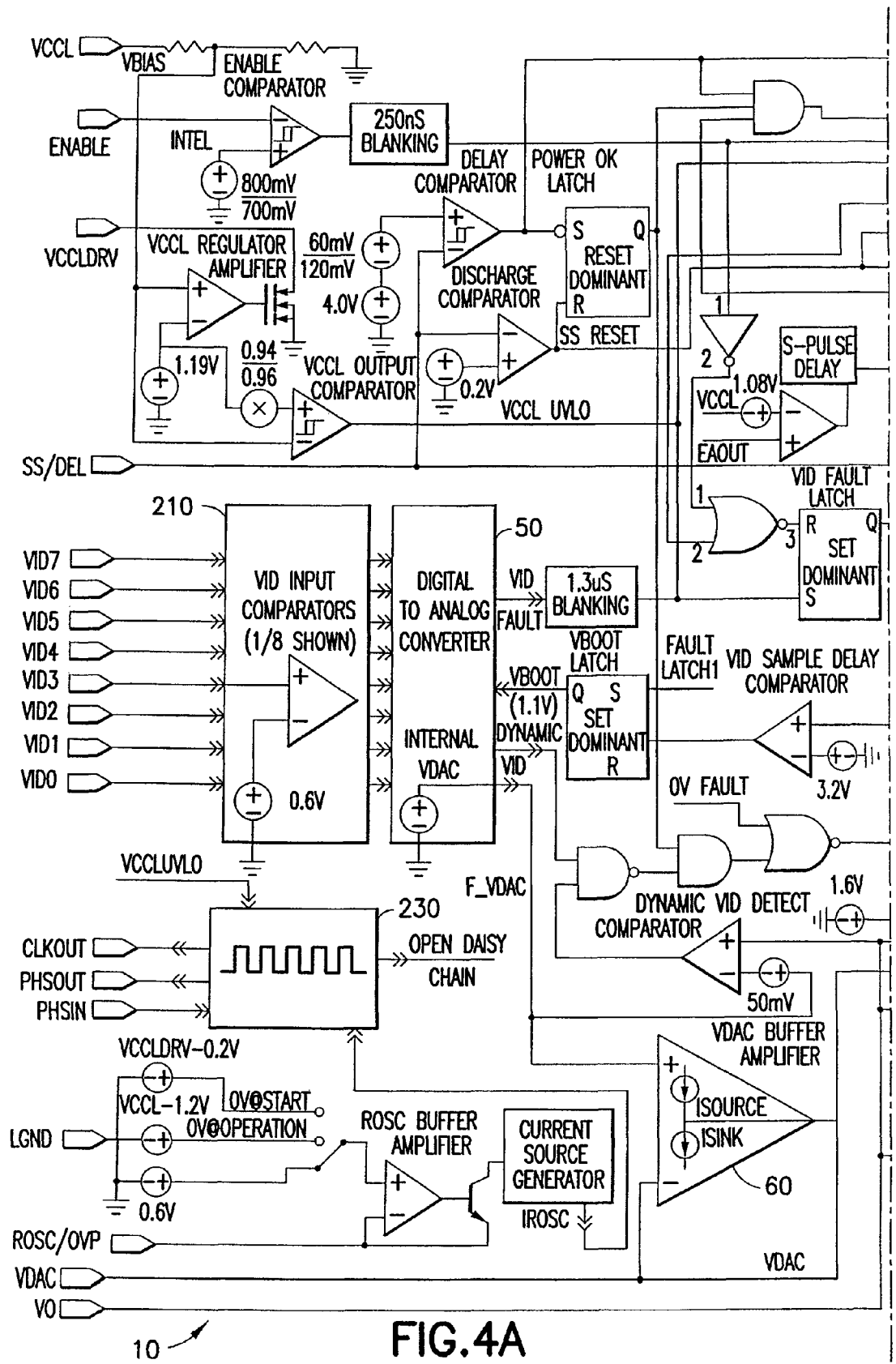
FIG. 4 shows a detailed block diagram of the control circuit of FIG. 1.

FIG. 4 shows details of the control integrated circuit. Only those portions which are relevant to the invention will be described in detail.

As previously described, the VID inputs VID0-VID7 determine the converter output voltage. The VID inputs are fed into a VID input comparator section 210 whose output is fed to the digital to analog converter 50 which provides the VDAC signal after buffering in a buffer amplifier 60.

The remote sense amplifier 30, as previously described, receives signals VOSEN+ AND VOSEN− and produces the voltage VO for feedback. The error amplifier 20 is also shown in detail including its input FB and an input for a set point VSETPT.

The IC 10 also includes a clock circuit 230 producing the clock signal CLKOUT and the phase output signal PHSOUT for driving the first phase IC 100 as well as the phase input PHSIN received from the last phase IC 100.

FIG. 4 also shows the thermal compensation amplifier 200, the VDAC buffer 205 and a current amplifier 220.

FIG. 5 shows details of the control IC 100. The control IC 100 includes the PWM comparator 70 for producing the PWM signal which is fed to a PWM latch 75 which is clocked by the clock signal CLKIN from the control IC. The input to the PWM latch is the signal PHSIN also from the control IC. The PWM signal from the PWM comparator resets the latch 75 which clocks the PHSIN signal through to the output driver stages which include GATE H and GATE L non-overlap latches and comparators to ensure that there is dead time between the on times of the high and low switches U11 and U10. Switch U11 is driven by the gate driver 310. Switch U10 is driven by the gate driver 320. The high side gate driver 310 is powered by the boost voltage BOOST which is developed at the CBST capacitor shown in FIG. 2 charged from VCCL through a bootstrap diode emulator switch 315. 0062 Phase integrated circuit 100 receives a PSI signal (power state indicator signal) from the microprocessor load whose function will be described in more detail herein.

In addition, integrated circuit 100 receives input CSIN+ and CSIN− which is provided to a current sense amplifier 350. The output of the current sense amplifier represents the sensed inductor current for that phase. The sensed inductor current is added to voltage DACIN representing the desired output voltage in a summing stage 360 whose output is provided to a share adjust amplifier 370. The share adjust amplifier 370 provides an output via a summing stage 380 to the PWM ramp generator to modify the generated ramp voltage to ensure that the phase provides a current that is equal to the other phases of the multiphase converter. A voltage generated across a resistance RCS disposed across the share adjust amplifier 370 inputs, represents the average current being supplied by all the phases.

As described previously, in order to avoid a perturbation in the current sharing loop and saturation of the output inductors of the running phases when a phase is switched on or off, the present invention provides a control method to secure proper stepping into and out of the phase shedding mode when the PSI signal is executed, either when the PSI signal requires a phase to be shed or a phase to be added.

In a light load condition, the multiphase converter receives the PSI assertion signal from the CPU or generates a PSI linked signal itself. The controller may initiate a change in the number of phases present in the regulator. According to the invention, it is preferred that there is an embedded delay of at least twice the transient step change response time before reducing the number of phases. This delay will avoid any interaction between phase number change, related transient and the possible load transient event. Such an arrangement allows the loop to respond to high rate repetitive transients with lower output impedance since the PSI assertion signal is masked by this delay if PSI toggling duration is less than the delay time and all the phases are active to respond to the load change.

When the PSI signal is asserted, the disabled phase is disconnected from the current sharing bus after a delay. Otherwise, the disabled phase might issue a larger than needed pulse width when it is restarted since the current sharing loop forces it to supply more than the needed current, which will lead to an excessive overshoot when the PSI signal is de-asserted. In addition, voltage loop compensation needs to be changed to compensate for the LC double pole movement.

Whenever the voltage regulator receives the PSI de-assert signal from the CPU, i.e., load increases, or the regulator senses a heavier load condition, the phase add control algorithm brings in all the disabled phases but only allows the high side control switch to turn on first. Thus, the high side switches U11 of FIG. 2 turn on first and the synchronous or low side switches U10 hold off until the paired control switch U11 has experienced one on cycle after the PSI de-assertion.

The described method avoids sinking current when stepping out of the phase shedding mode and imposing excessive load on the regulator. Furthermore, this lifts the output voltage to offset the voltage dip when the load step up occurs and thereby results in less undershoot.

Figure 5A:
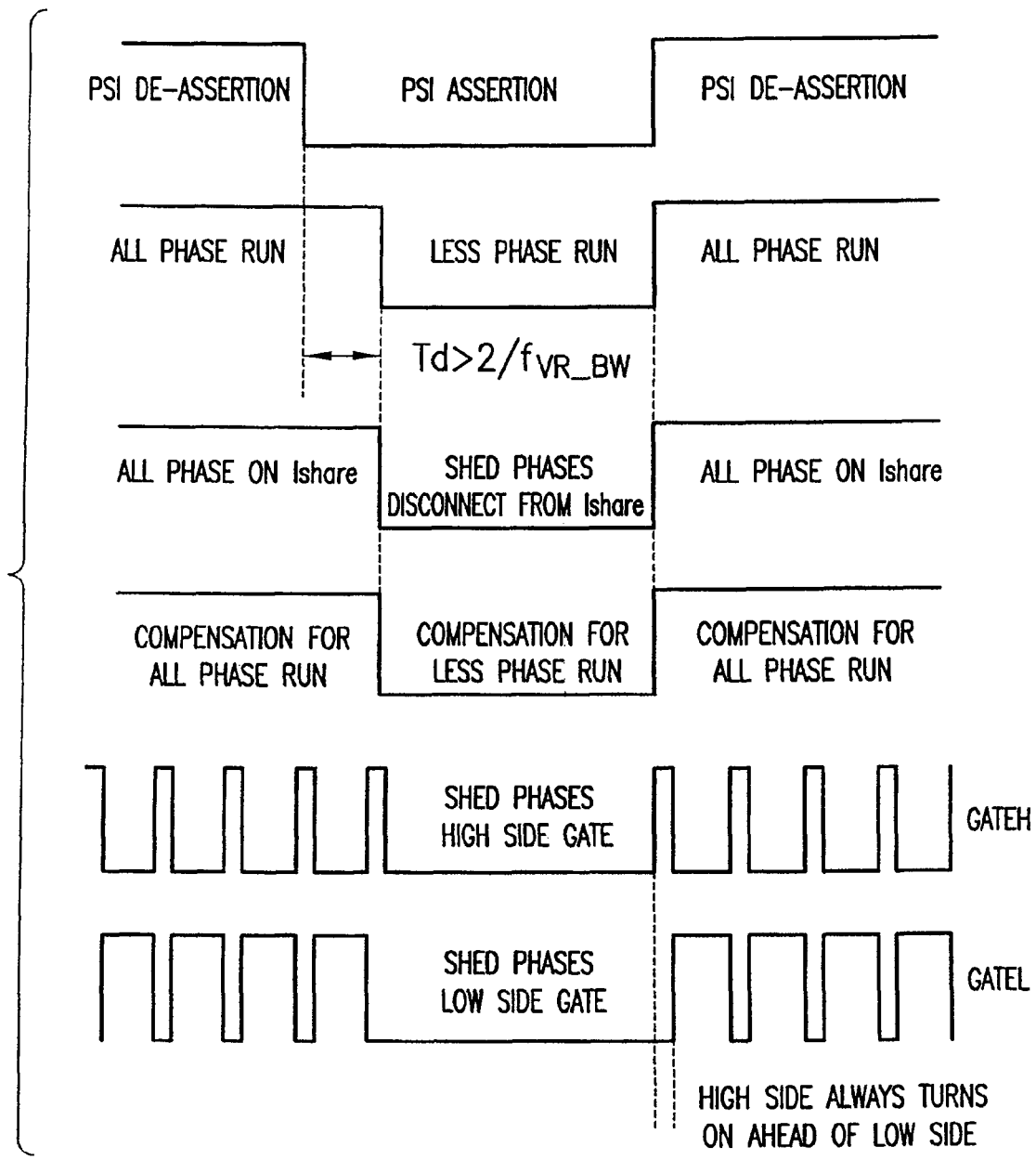
FIG. 5A shows the relationship of the PSI signal and the turn-off delay and early high side turn-on according to the present invention.

FIG. 5A shows a timing diagram of the control algorithm.

As shown in FIG. 5A, when the PSI signal is asserted, it is low. This means that less than all phases should be run. As shown in FIG. 5A, after the PSI signal goes low and is asserted, there is a delay Td which is equal to twice the transient step change 1/fVR_BW. The corresponding high and low side gate signals are shown in FIG. 5A. The gate signals continue to be provided for the period Td after the PSI assertion. As a result, this provides for less output voltage variation when the phases are shed and high bandwidth to respond to the load change.

As also shown in FIG. 5A, when the PSI signal is de-asserted, requiring that all phases again operate, the high side switch is turned on (see GATE H) ahead of the low side switch (see GATE L). This prevents excessive current sinking when the regulator steps out of the phase shedding mode.

The circuit for implementing the delay is shown in FIG. 5, and implemented in the phase IC 100. The PSI signal is received by the phase IC and provided to a PSI comparator 500. In the implementation shown, when PSI is low, it is requesting the low power phase shedding state. The PSI comparator 500 compares the PSI signal to a reference voltage. The output of the comparator 500 is provided to AND logic circuit 510 whose other input is provided from a synchronous rectification disable comparator 520. The function of comparator 520 is to disable synchronous rectification, i.e., switch U10, if current flows in a reverse direction in inductor L1. Comparator 520 receives an input from the current sense input CSIN− which is tied to the converter output. When synchronous rectification is enabled (CSiN− is above the threshold set by reference 521), the other input to the AND circuit 510 will be high by virtue of inverter 530. Accordingly, when PSI is asserted, i.e., is low, and it is necessary to shed phases, the output of comparator 500 will be high resulting in a high output of AND circuit 510. The output of AND circuit 510, when high, will set latch 540 resulting in the inverted logic (NQ) output of the latch 540 going low. This results in a high output of NAND circuit 550 which enables an AND circuit 560 driving the low side driver for switch U10 and AND circuit 570 driving the high side driver for switch U11. This maintains the high side and low side drivers on for a period of time. At the same time that the output of AND circuit 510 is high, another latch 545 is enabled. This latch is clocked by the signal PHSIN from the control IC 10 which clocks a pulse through to its Q output thereby to reset the latch 540. The output of Gate 550 then goes low thereby disabling gate circuits 560 and 570. Accordingly, a delay Td has been implemented from the assertion of the PSI signal (PSI low) allowing both switches U11 and U10 to operate for a delay time Td after assertion of the PSI signal. This implements the desired delay shown in FIG. 5A. Preferably, the delay is Td>2/f$_{VR\_BW}$, that is the delay Td is greater than twice the transient step change response time.

Thus, the delay (Td) from assertion of PSI is provided by the logic latch 545. When PSI is asserted low, the output of AND gate 510 is high, which sets latch 540. The NQ output of 540 will be low until the output of latch 545 is asserted high after a count of 8 switching cycles of PHIN (the CLK of 545) thus resetting latch 540 causing the NQ output to be high. When the NQ of 540 is high and PSI is still asserted low, the output of 550 will be low, which shuts off the high side and low side switches through the AND gates 560 and 570.

The latch 620 in FIG. 5 ensures the high side turns on first. When PSI is deasserted high (PSI goes high), the output of AND gate 510 is low forcing the output of NAND gate 550 to be high. The output of the latch 620 in FIG. 5 is now low because it has been reset during PSI assertion. Therefore, the Q output is low which disables the low gate driver through the logic of gates 610 and 560 until the latch 620 receives a high to the CLK input from the latch 75. Latch 75 enables the high side switch via gate 570, thus ensuring the high side is enabled prior to the low side switch after PSI de-assertion.

Accordingly, a delay has been implemented when a phase is to be shed and, when the phase is turned back on, it is ensured that the high side switch turns on first. Preferably, the low side switch turn-on is delayed until the high side control switch has experienced one on cycle after PSI de-assertion as shown in FIG. 5A.

FIG. 7 shows simulation waveforms for the converter circuit employing the PSI implementation circuit described. The PSI signal is shown. The other waveforms are the voltage present at the switched node SWN between the switches U10 and U11, the delayed signal DPSI at the output of circuit 550, the error amplifier output EAOUT, the ramp signal RMPOUT at the input to the PWM comparator 70, the inductor current signal IL and the converter output voltage VOUT. As can be seen, the phase being shut down continues to switch for the delay time after the PSI signal has been asserted. The VOUT signal has been shown with and without the delay. The waveform without the delay is the one that shows noticeable undershoot. The waveform with the delay has a markedly improved response not exhibiting the undershoot that is present in the voltage waveform from a converter that does not implement the described delay.

FIG. 8 shows simulation waveforms showing that the high side switch turns on ahead of the low side switch for a phase that is being turned back on. The signals shown includes the clock, the signal PSI, the switching node signal SWN, the inductor current IL and the output VOUT. FIG. 8 illustrates a load step increase and termination of the phase shedding mode. PSI de-assertion is issued ahead of the load step up. The disabled phases are shown being enabled with the control FET switches turning on first to avoid sinking current after the PSI signal de-assertion.

Figure 8A:
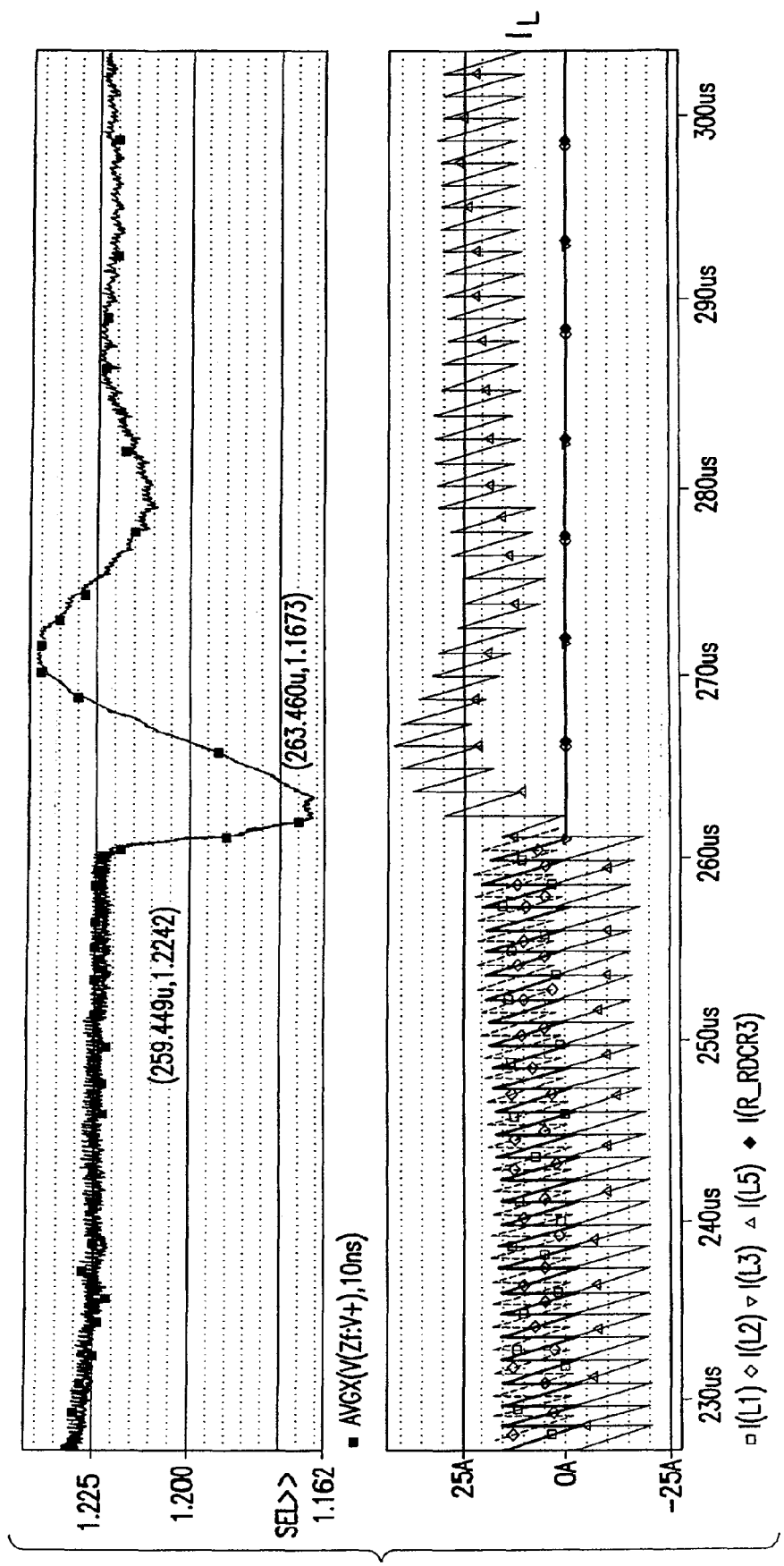
Figure 8B:
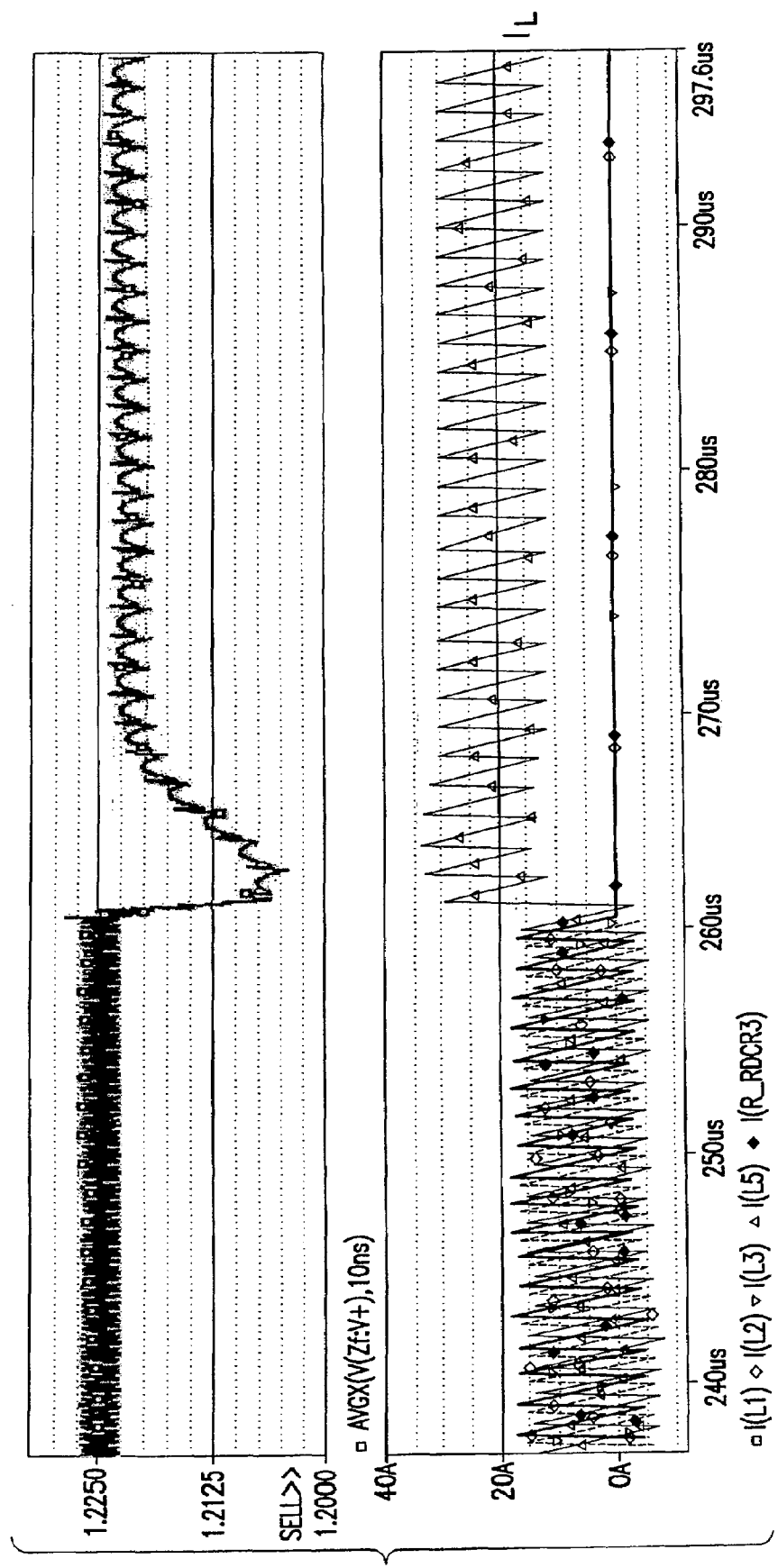

FIGS. 8A and 8B show in a simulation the comparison between disconnecting the disabled phases from the current share bus and changing the compensation. FIG. 8A shows that the inductor current in a remaining phase will be far from the disabled phases when being added back into the converter output due to the integration portion of a slow current sharing loop while it would be the same level when the disabled phases are disconnected from the share bus as shown in FIG. 8B. Accompanied with the outmost voltage loop compensation change when shedding the phases, the voltage variation can be substantially reduced, as shown by FIG. 8B.

Figure 8C:
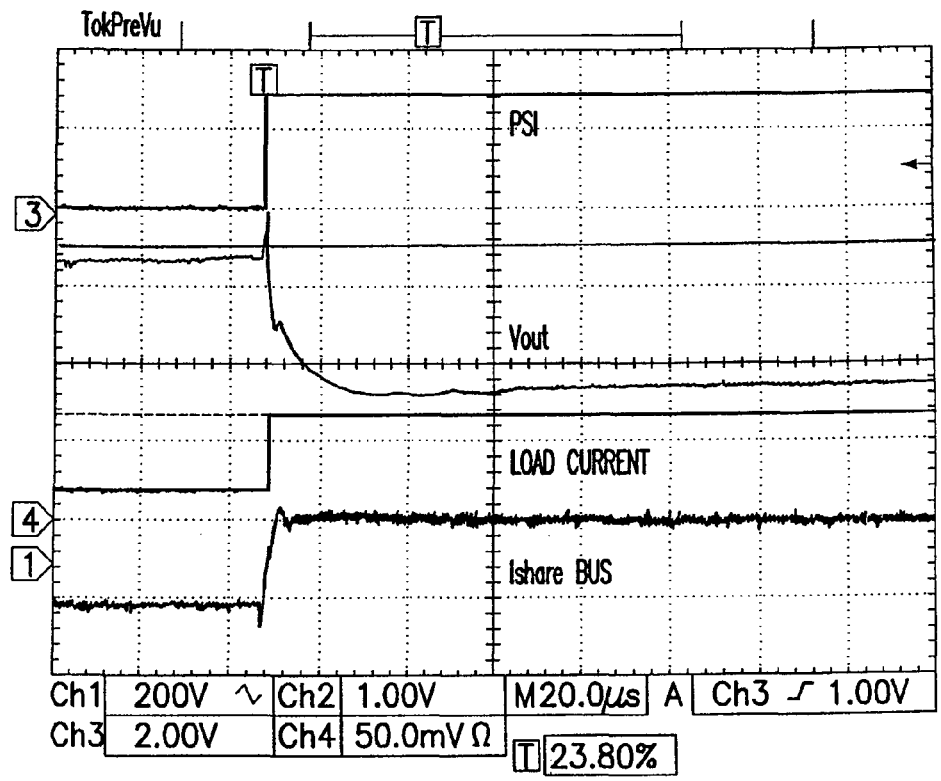
Figure 8D:
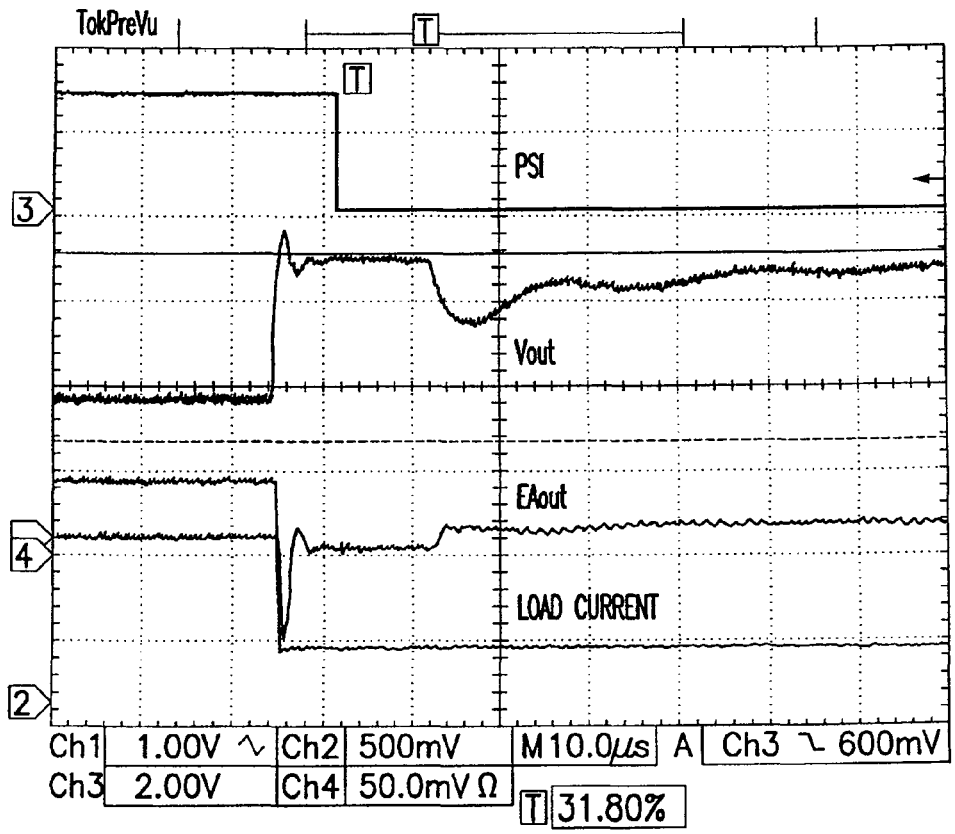

FIG. 8C to 8G shows experimental results. FIG. 8C shows the PSI signal and the output voltage VOUT and load current during a load step up after PSI de-assertion. FIG. 8D shows phase shedding with load step down after PSI assertion. In FIG. 8C, phases are enabled during load step up after PSI de-assertion. The control switches are turned on first, a slight output voltage increase cancels the voltage dip when the load steps up and therefore undershoot is reduced. In FIG. 8D, when a load release transient occurs just before PSI assertion, the converter sheds phases after a fixed delay to avoid interaction between these two events.

Figure 8E:
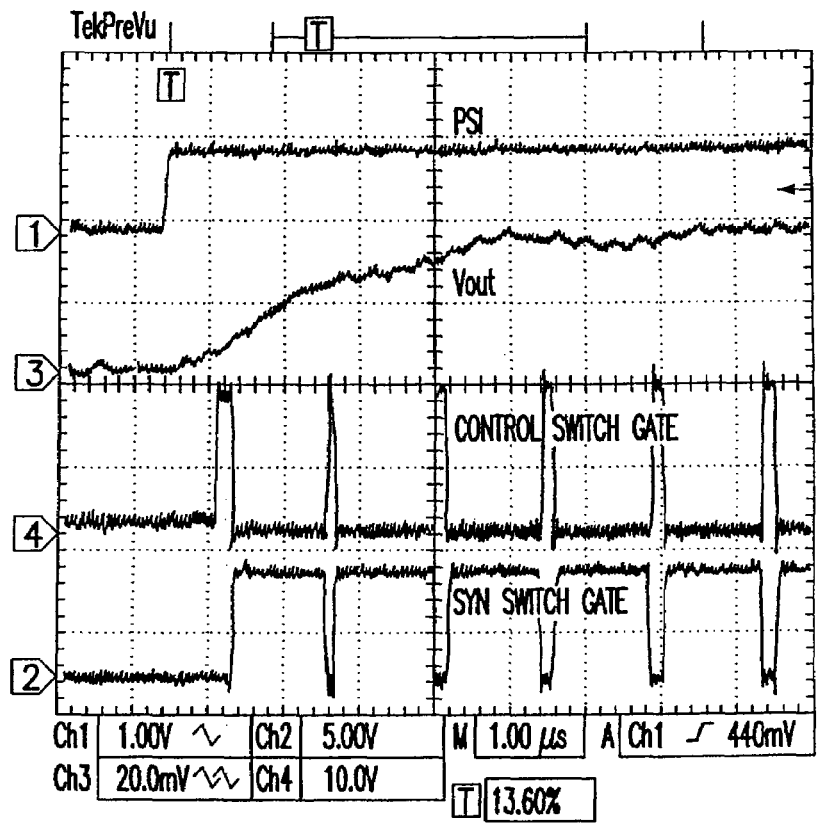

FIG. 8E shows the control switch always being enabled first after the PSI signal de-assertion to avoid sinking current from other phases. This avoids possible inductor saturation or overcurrent reaction.

Figure 8F:
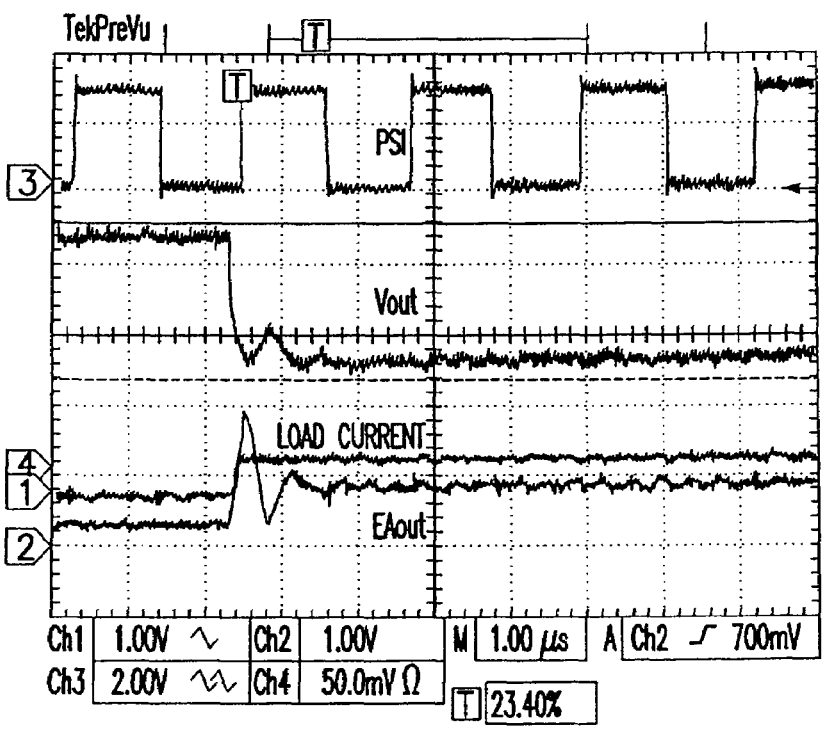
Figure 8G:
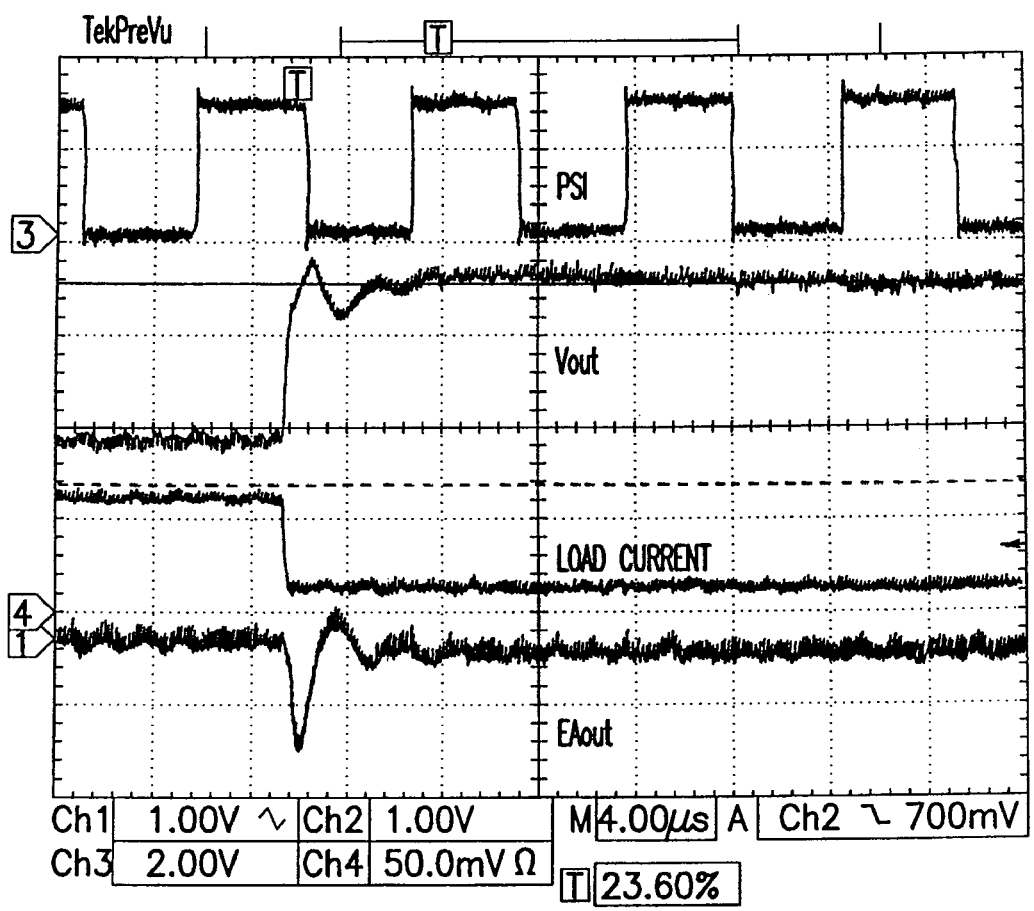

When the load repetitive transient rate exceeds a certain frequency threshold, one third of bandwidth for this design, phase shedding is disabled. This ensures low output impedance for faster response to load changes. Since the output impedance of the voltage regulator is well controlled to its load line up to bandwidth, such an arrangement can ensure well-managed dynamic behavior during any high repetitive transient. This is illustrated in FIG. 8F, load step up, and FIG. 8G, load step down, respectively.

The phase shedding control technique described has been validated by simulated and experimental results. It has the following advantages: it allows differentiating phase shedding related transients and load change resulting transients; it avoids imposing overcurrent into the converter and reduces undershoot when load stepping up and regulator stepping out of the phase shedding mode; and low output impedance is provided to respond to high repetitive transient events.

FIG. 10 shows the circuit for compensating for the change of the output inductor DC resistance with temperature.

The uncompensated current information IIN, which represents the average current from each of the converter phases, is referenced to VDAC and present at IIN. The external resistance network comprising RTCMP1, the thermistor NTC 1 having a negative temperature coefficient, and the resistors RTCMP2 and RTCMP3 provides a compensated reference for the amplifier 200 which provides the output VDRP. The output VDRP represents a buffered, scaled and thermally compensated average current signal. This signal VDRP is fed to the feedback terminal FB of the control IC via an external RC network to program the converter output impedance. This network is shown in FIG. 1 and comprises the components RDRP, RCP, CCP, CCP1, CFB, RFB and RFB1.

VDRP is given by the following equation:

$$V_{DRP} = \left[\frac{RTCMP3/(RTCMP1+R(T))}{RTCMP2}+1\right] - \frac{IPH - DCR(T) \cdot G_{CSA}}{2} + VDAC$$

In this equation, RTCMP1, RTCMP3 and RTCMP2 are the external resistances in the external resistor network, IPH is the phase current, DCR is the inductor DC resistance, GCSA is the gain of the current sense amplifier and R(T) is thermistor resistance.

Figure 6:
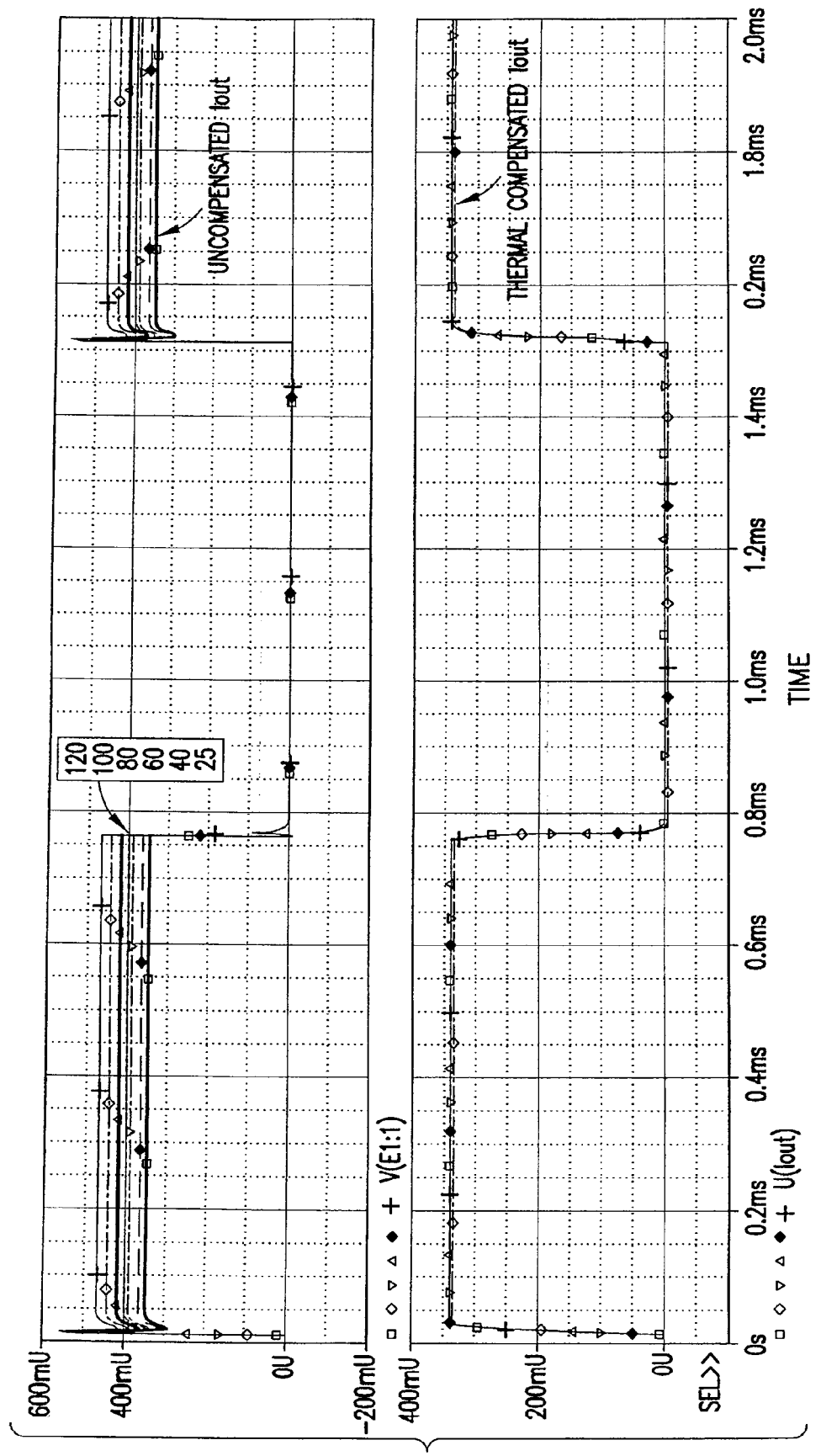
FIG. 6 shows how a circuit according to the present invention for providing thermal compensation for the inductor DCR improves the output current waveform.

FIG. 6 shows the operation of the circuit. In the top waveform, the load current IOUT is shown at various temperatures ranging from 25 to 120° C. The bottom waveform shows that with thermal compensation, IOUT for the same temperatures track markedly well.

FIG. 9 shows the current monitor implementation according to the invention. The thermally compensated VDRP signal is fed via resistors R5 and R7 to an amplifier 275. An offset is provided by resistor R6 from an offset reference source VOFFSET. Resistor R8 provides the DAC buffer signal to the inverting input of the amplifier 275. Feedback is provided by resistor R9.

A smoothing capacitor C1 is provided between the amplifier non-inverting input and ground.

According to the circuit, current information contained in VDRP is subtracted from the VDAC reference by amplifier 275 and summed with the offset from the offset reference voltage. The resulting output IMON is referenced to a remote sense ground VOSEN–. The output taken between IMON and VOSEN– is a voltage representation of the converter current information. The slope of IMON can be programmed with the external resistor network contained in the implementation of the VDRP difference amplifier 200. The signal IMON is given by the equation below:

IMON=(VDRP–DAC–BUFF)+(0.05+VOSEN–)

The current monitor output IMON has a programmable slope and provides accurate converter current information referenced to the remote Kelvin ground VOSEN–.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A multiphase converter comprising a plurality of converter circuits, each converter circuit having series connected high and low side switches connected across a voltage bus with a common node provided therebetween, each of the common nodes connected through a respective inductor to an output node of the converter coupled to a load, the high and low side switches each being controlled by a control circuit to provide a desired output voltage at the output node, the control circuit including a first circuit for disabling and enabling at least one phase in response to a condition of the load, the first circuit causing the high side switch to be turned on prior to the lower side switch when a disabled phase is enabled.

2. The multiphase converter of claim 1, wherein the control circuit receives a power state indicator (PSI) signal representative of load condition, the PSI signal having two states, a first state instructing the control circuit to operate the converter using all phases and a second state instructing the converter to shed at least one phase, the first circuit causing the high side switch to be turned on prior to the low side switch when the PSI signal changes from the second state to the first state requiring all phases to be operating.

3. The multiphase converter of claim 2, wherein the first circuit comprises a circuit for receiving the PSI signal and for disabling a low side driver driving the low side switch for a defined period of time.

4. The multiphase converter of claim 3, wherein the first circuit includes circuitry for delaying the turn-on of the low side switch for at least one on pulse duration of the high side switch.

5. The multiphase converter of claim 2, wherein the first circuit further comprises a delay circuit for delaying turning off the low side and high side switches when the PSI signal Moves from the first state to the second state.

6. The multiphase converter of claim 1, wherein each of said plurality of converter circuits further comprises:
an output capacitance coupled across the output of the converter circuit;
an inductive current sensing circuit comprising a current sense amplifier connected to said inductor to sense the inductor current using an internal DC resistance of said inductor;
an error amplifier circuit receiving a feedback voltage from said output node, said error amplifier signal configured to produce an error signal representing a deviation of the converter output voltage from a reference voltage; and
a thermal compensation circuit receiving a signal proportional to the inductor current that is uncompensated for the inductor DC resistance change with temperature, and for providing a feedback signal to said error amplifier circuit that is corrected for temperature changes in the DC resistance of said inductor, said thermal compensation circuit comprising a single negative temperature coefficient element connected to a resistor network.

7. The multiphase converter of claim 6, wherein each of said plurality of converter circuits further comprises a remote sense amplifier for sensing the load voltage of said converter circuit and having an output coupled as the feedback voltage to said error amplifier circuit.

8. The multiphase converter of claim 6, wherein said thermal compensation circuit comprises a difference amplifier having two inputs and an output, said difference amplifier receiving at a first input a signal proportional to the uncompensated inductor current and at a second input a signal from the amplifier output through said resistor network, and wherein said difference amplifier output is connected as a feedback to said error amplifier circuit thereby compensating said feedback voltage for the effects of temperature on the DC resistance of said inductor.

9. The multiphase converter of claim 8, wherein the output of said difference amplifier comprises a voltage proportional to said inductor current corrected for temperature changes in said DC resistance of said inductor and referenced to the desired output voltage of said converter.

10. The multiphase converter of claim 8, wherein said resistor network comprises a series connection of a first resistor having a positive temperature coefficient, a second resistor having a negative temperature coefficient, and a third resistor having a positive temperature coefficient in parallel with said first two resistors, said resistor network coupled between said output and one input of said difference amplifier.

11. The multiphase converter of claim 8, further wherein a reference voltage setting the desired converter circuit output voltage is coupled through a resistor to said first input of said difference amplifier and further coupled through a further resistor to said second input of said difference amplifier.

12. The multiphase converter of claim 11, wherein said reference voltage is coupled through a buffer to said difference amplifier.

13. The multiphase converter of claim 1, wherein each of said plurality of converter circuits further comprises:
- an output capacitance coupled across the output of the converter circuit;
- a current sensing circuit comprising a current sense amplifier connected to sense an output current in said inductor and generating a first signal proportional to said output current; and
- a circuit receiving said firstsignal proportional to said output current and for generating a voltage representation of said output current of the converter circuit.

14. The multiphase converter of claim 13, wherein said circuit generating said voltage representation of said output current comprises an amplifier receiving said first signal proportional to said output current at a first input, a reference voltage setting converter output voltage at a second input, and having an output at which said voltage representation of said output current is present.

15. The multiphase converter of claim 14, wherein said amplifier operates to form a difference between said first signal and said reference voltage summed with an offset voltage, and said output is referenced to a remote sense ground of said converter circuit.

16. The multiphase converter of claim 14, further comprising:
- a first resistor coupling said first signal to a first node, a second resistor coupling said offset voltage to said first node, and a third resistor coupling said first node to said amplifier first input;
- a capacitor coupled between said amplifier first input and ground; and
- a fourth resistor coupled to said converter circuit reference voltage and a fifth resistor coupling said output of said amplifier and said second input.

17. The multiphase converter of claim 16, wherein said current sense amplifier senses said output current using the internal DC resistance of said inductor, and wherein each of said plurality of converter circuits further comprises:
- an error amplifier circuit receiving a feedback voltage from said output node, said error amplifier configure to produce an error signal representing a deviation of the converter circuit output voltage from the reference voltage;
- a thermal compensation circuit receiving a signal proportional to said output current that is uncompensated for the inductor DC resistance change with temperature, said thermal compensation circuit configured to provide said first signal as a feed back signal to said error amplifier circuit that is corrected for temperature changes in the DC resistance of said inductor.

18. The multiphase converter of claim 17, wherein said thermal compensation circuit comprises a difference amplifier having two inputs and an output, the difference amplifier receiving at a first input a signal proportional to the uncompensated inductor current and at a second input a signal from the difference amplifier output through a resistor network, and wherein said difference amplifier output is connected as a feedback to said error amplifier circuit thereby compensating said feedback voltage for the effects of temperature on the DC resistance of said inductor.

19. The multiphase converter of claim 18, wherein a slope of said voltage representation is programmable by said resistor network, said resistor network including a resistor with a negative temperature coefficient.

20. A multiphase converter comprising a plurality of converter circuits, each converter circuit having series connected high and low side switches connected across a voltage bus with a common node provided therebetween, each of the common nodes connected through a respective inductor to an output node of the converter coupled to a load, the high and low side switches each being controlled by a control circuit to provide a desired output voltage at the output node, the control circuit receiving a power state indicator (PSI) signal, the PSI signal having two states, a first state instructing the controller to operate the converter using all phases and a second state instructing the converter to shed at least one phase, the control circuit including a first circuit comprising a delay circuit for delaying turning off the low side and high side switches when the PSI signal moves from the first state to the second state.

21. The multiphase converter of claim 20, wherein the first circuit comprises a comparator for sensing the PSI signal and having an output coupled to a latch for maintaining drivers for the high and low side switches in an enabled condition, and a delay circuit for turning off the latch after a preset period of time thereby to turn off the high and low side switches after the preset period of time.

22. The multiphase converter of claim 21, wherein the delay circuit implements a time delay of at least twice a transient step change response time of the converter.

* * * * *

UNITED STATES PATENT AND TRADEMARK OFFICE
CERTIFICATE OF CORRECTION

| | | |
|---|---|---|
| PATENT NO. | : 7,982,441 B2 | Page 1 of 1 |
| APPLICATION NO. | : 12/030269 | |
| DATED | : July 19, 2011 | |
| INVENTOR(S) | : Crowther et al. | |

It is certified that error appears in the above-identified patent and that said Letters Patent is hereby corrected as shown below:

In the claims, column 12, line 27, "Moves" should be changed to --moves--.

In the claims, column 13, line 24, "firstsignal" should be changed to --first signal--.

Signed and Sealed this

Twentieth Day of December, 2011

David J. Kappos
*Director of the United States Patent and Trademark Office*